(12) United States Patent
Arai

(10) Patent No.: US 9,331,539 B2
(45) Date of Patent: May 3, 2016

(54) MOTOR POWER DISTRIBUTION APPARATUS

(75) Inventor: Kenji Arai, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 496 days.

(21) Appl. No.: 13/700,680

(22) PCT Filed: May 25, 2011

(86) PCT No.: PCT/IB2011/001120
§ 371 (c)(1),
(2), (4) Date: Nov. 28, 2012

(87) PCT Pub. No.: WO2011/151692
PCT Pub. Date: Dec. 8, 2011

(65) Prior Publication Data
US 2013/0069461 A1    Mar. 21, 2013

(30) Foreign Application Priority Data

Jun. 2, 2010  (JP) .................................. 2010-126959

(51) Int. Cl.
*H02K 3/38* (2006.01)
*H02K 15/00* (2006.01)
*H02K 3/52* (2006.01)

(52) U.S. Cl.
CPC .................. *H02K 3/38* (2013.01); *H02K 3/522* (2013.01); *H02K 15/00* (2013.01); *H02K 2203/09* (2013.01); *Y10T 29/49009* (2015.01)

(58) Field of Classification Search
CPC ......... H02K 3/38; H02K 3/522; H02K 15/00; H02K 15/0025; H02K 2203/09
USPC .............. 310/71, 238, 43, 68 R, 214; 29/596; 439/675
IPC ................................................. H02K 3/38,15/00
See application file for complete search history.

(56) References Cited

U.S. PATENT DOCUMENTS

| 4,115,915 | A | * | 9/1978 | Godfrey | .................... | H02K 3/12 |
| | | | | | | 29/596 |
| 4,731,555 | A | * | 3/1988 | Torimoto | ............... | H02K 5/225 |
| | | | | | | 310/194 |
| 5,682,070 | A | * | 10/1997 | Adachi et al. | .................... | 310/71 |
| 5,686,780 | A | * | 11/1997 | Adachi et al. | ............... | 310/68 D |

(Continued)

FOREIGN PATENT DOCUMENTS

| CN | 1414674 A | 4/2003 |
| DE | 102007040809 | 3/2009 |

(Continued)

OTHER PUBLICATIONS

The European Office Action for the corresponding European Application No. 11730741.3-1809, issued on Mar. 18, 2014.

(Continued)

*Primary Examiner* — John K Kim
(74) *Attorney, Agent, or Firm* — Global IP Counselors, LLP

(57) ABSTRACT

A motor power distribution apparatus includes first insulating holders and second insulating holders. The first insulating holders are disposed to retain every other one of a plurality of stacked power distribution members that are unified by insert molding. The second insulating holders are disposed to retain power distribution members other than the power distribution members retained by the first insulating holders.

16 Claims, 24 Drawing Sheets

(56) References Cited

U.S. PATENT DOCUMENTS

| | | | |
|---|---|---|---|
| 6,930,418 B2 | 8/2005 | Kobayashi et al. | |
| 7,193,345 B2* | 3/2007 | Shinzaki | H02K 3/522 310/179 |
| 7,219,417 B2* | 5/2007 | Kobayashi | H02K 15/0056 29/596 |
| 7,476,995 B2* | 1/2009 | Uchiyama | H02K 3/505 310/179 |
| 7,626,294 B2* | 12/2009 | Ohta | H02K 1/148 310/194 |
| 8,922,079 B2* | 12/2014 | Egami | H02K 3/522 310/71 |
| 2003/0090166 A1 | 5/2003 | Kobayashi et al. | |
| 2003/0173842 A1* | 9/2003 | Kobayashi | H02K 15/0056 310/71 |
| 2004/0251752 A1 | 12/2004 | Shinzaki et al. | |
| 2007/0176501 A1* | 8/2007 | Nishimura et al. | 310/68 R |
| 2009/0039720 A1 | 2/2009 | Tsukashima et al. | |
| 2011/0018375 A1* | 1/2011 | Kimura et al. | 310/71 |
| 2013/0069461 A1* | 3/2013 | Arai | 310/71 |

FOREIGN PATENT DOCUMENTS

| | | |
|---|---|---|
| DE | 102009045551 | 5/2010 |
| JP | 2005-160137 A | 6/2005 |
| JP | 3902219 B1 | 4/2007 |
| JP | 2009-89456 A | 4/2009 |
| WO | WO-2009/041172 | 4/2009 |

OTHER PUBLICATIONS

An English translation of the Chinese Office Action for the corresponding Chinese patent application No. 201180027451.9 issued on Jun. 25, 2014.

The Chinese Office Action for the corresponding Chinese Application No. 201180027451.9 issued on Jan. 6, 2015.

International Search Report of PCT/IB2011/001120 dated Apr. 26, 2012, mailed May 21, 2012.

\* cited by examiner

US 9,331,539 B2

MOTOR POWER DISTRIBUTION APPARATUS

CROSS-REFERENCE TO RELATED APPLICATIONS

This application is a U.S. National stage of International Application No. PCT/IB2011/001120, filed May 25, 2011. This application claims priority to Japanese Patent Application No. 2010-126959, filed on Jun. 2, 2010. The entire disclosure of Japanese Patent Application No. 2010-126959 is hereby incorporated herein by reference.

BACKGROUND

1. Field of the Invention

The present invention generally relates to a motor power distribution apparatus. More specifically, the present invention relates to a motor power distribution apparatus having insulating holders that are configured to retain bus bars in a manner which can improve creepage insulation.

2. Background Information

A motor power distribution apparatus is generally configured to distribute electrical current to winding wires of a motor. For example, Japanese Patent No. 3733316 describes a motor power distribution apparatus that includes a molding resin which is used to integrally support U-phase, V-phase and W-phase metal bus bars. The metal bus bars function as the energizing paths for the motor. During the molding process, the molding resin is inserted into the motor system while the bus bars are temporarily retained in insulating holders.

SUMMARY

However, in some situations, the molded resin and the insulating holder may not completely cohere during the insertion molding process. Thus, small gaps may form between one or more of the insulating holders and the molded resin. Therefore, in order for the surface portion of the insulating holder to function as creepage insulation with respect to the metal bus bars instead of the molding resin functioning as solid insulation, the height of the wall of the insulating holder is raised. However, this increases the size of the power distribution system.

Accordingly, it is an object of the present invention to provide a motor power distribution apparatus that has a sufficient creepage insulation distance without the need to raise the height of the wall of any of the insulating holders.

In view of the state of the known technology, one aspect of the present disclosure is to provide a motor power distribution apparatus that basically includes first insulating holders and second insulating holders. The first insulating holders are disposed to retain every other one of a plurality of stacked power distribution members that are unified by insert molding. The second insulating holders are disposed to retain power distribution members other than the power distribution members retained by the first insulating holders.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
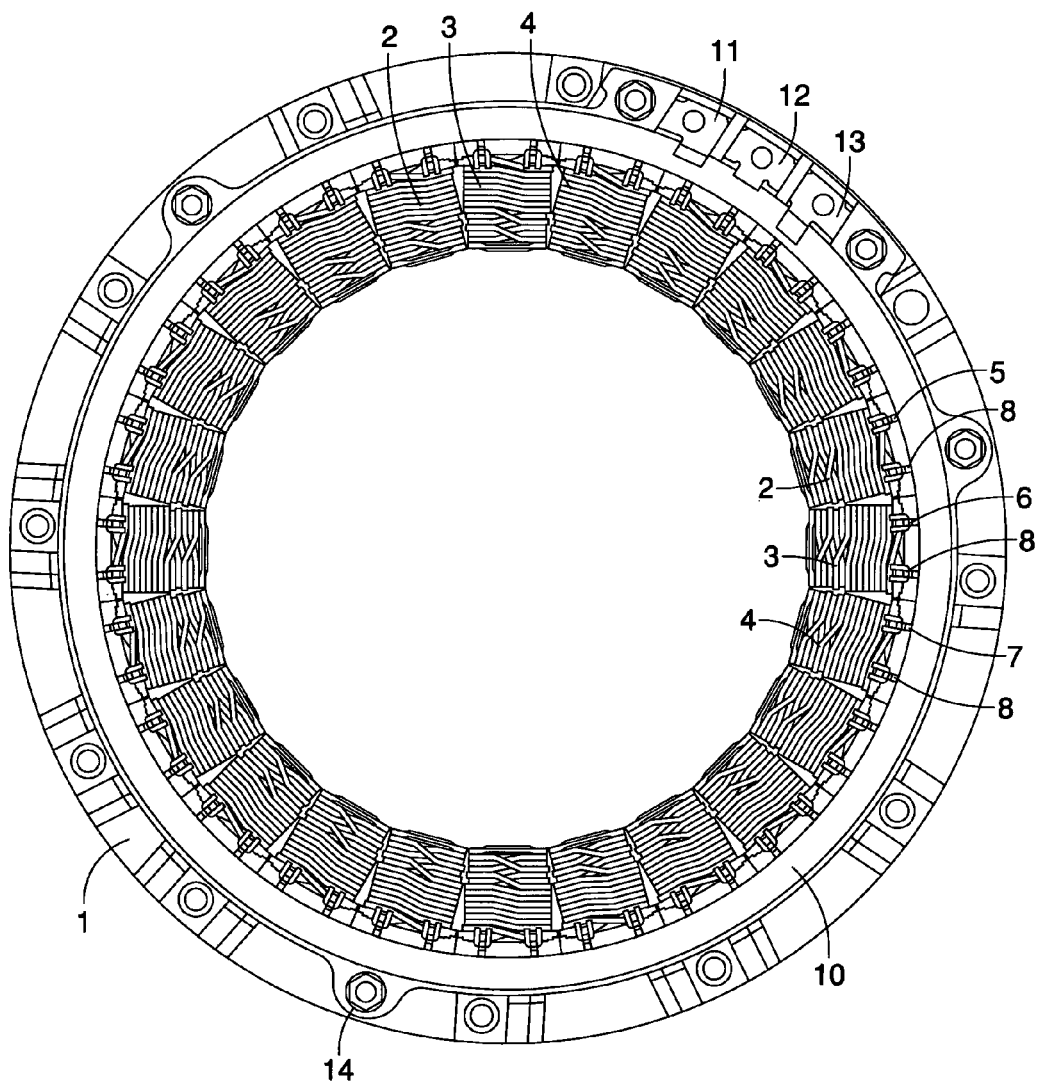
FIG. 1 illustrates an example of a stator that is included in a three phase AC concentrated winding motor.

FIG. 1 illustrates an example of a stator that is included in a three phase AC concentrated winding motor. The motor can be employed in, for example, a vehicle or in any other suitable apparatus. As understood in the art, teeth, which are not shown, project to the inside peripheral side from a stator core of ring shape retained in a housing 1. Copper wire is wrapped onto each of the teeth to form coils. The coils can be referred to as a U-phase coil 2, a V-phase coil 3 and a W-phase coil 4.

Electrical current is supplied from a power supply (not shown) to the power distribution structural component 10 according to this first disclosed embodiment. The power distribution structural component 10, which can also be referred to as a motor power distribution apparatus, distributes the electrical current to the U-phase coils 2, the V-phase coils 3 and the W-phase coils 4 via, for example, U-phase terminals 11, V-phase terminals 12, and W-phase terminals 13 respectively. In particular, in this example, the coils 2 to 4 of each phase are connected to the power distribution structural component 10 via tabs 5 to 7 of each phase.

Figure 2:
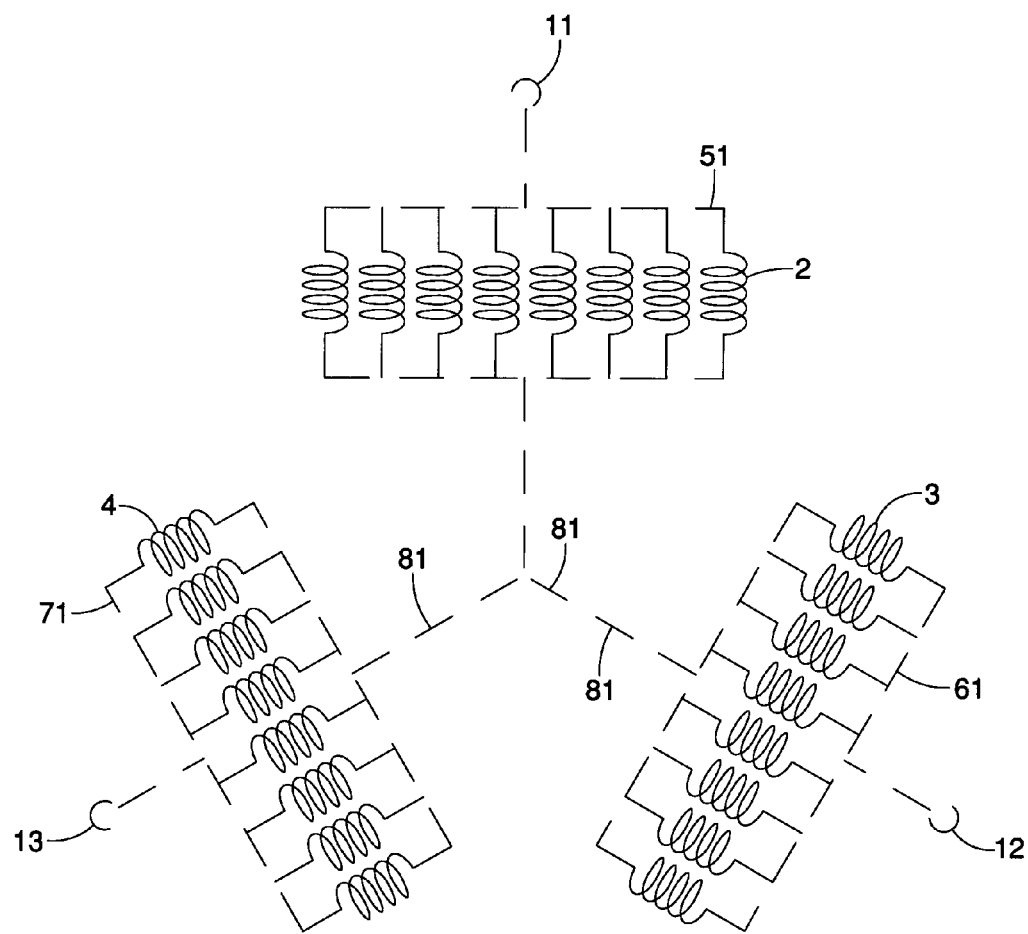
FIG. 2 is a schematic diagram illustrating an example of the electrical circuit of the stator.

FIG. 2 is a diagram showing an equivalent electrical circuit of the stator. The U-phase coils 2, the V-phase coils 3, and the W-phase coils 4 are each connected at one end to the U-phase terminal 11, the V-phase terminal 12 and the W-phase terminal, respectively, via a U-phase bus 51, a V-phase bus 61 and a W-phase bus 71, respectively. The terminals 11 to 13 of each of the phases are connected to the power supply, not shown, and supplied with power from this power supply. Also, the other ends of the coils 2 to 4 are coupled together to a neutral bus 81 that is at a prescribed electrical potential.

Figure 3:
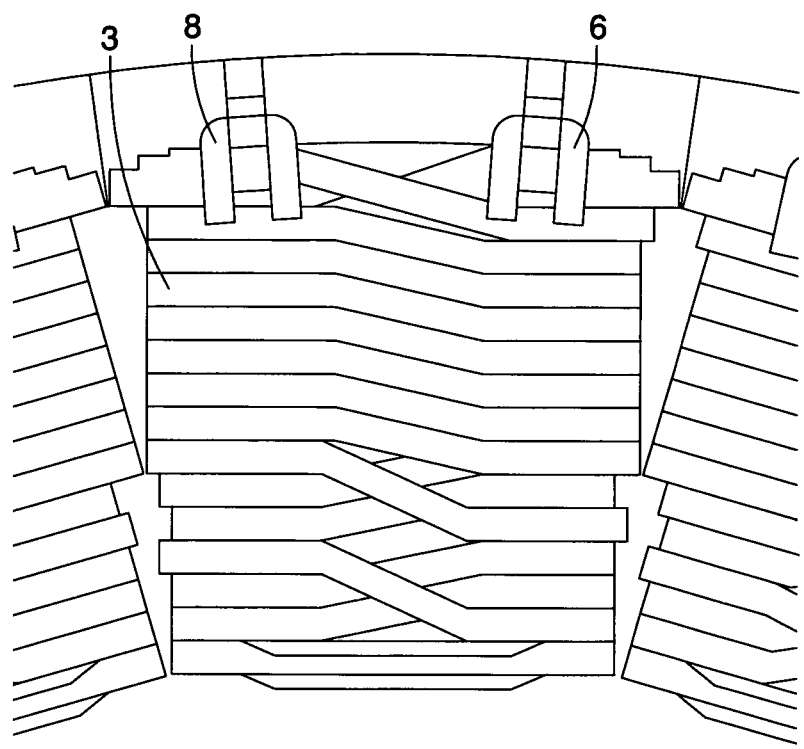
FIG. 3 is an enlarged view of a wire connection portion of a V-phase coil of the stator.

FIG. 3 is an enlarged view of a wire connection portion of a V-phase coil 3. However, the U-phase coils 2 and W-phase coils 4 can be configured in a similar manner. As stated previously, the V-phase coils 3 are connected to the power distribution structural component 10 via the V-phase tabs 6. The coils of each phase 2 to 4, and the tabs 5 to 7 of each phase 2 to 4, can be attached by welding, brazing, pressure bonding or the like, while maintaining electrical continuity. Also, since the attached portions of the coils 2 to 4 and tabs 5 to 7 generally lack mechanical strength sufficient to support the power distribution structural component 10, the power distribution structural component 10 is fastened to the housing 1 by fastening members 14, such as bolts, as shown in FIG. 1. However, the fastening members 14 can be screws, rivets, adhesive or any other type of suitable fastening member.

Figure 4:
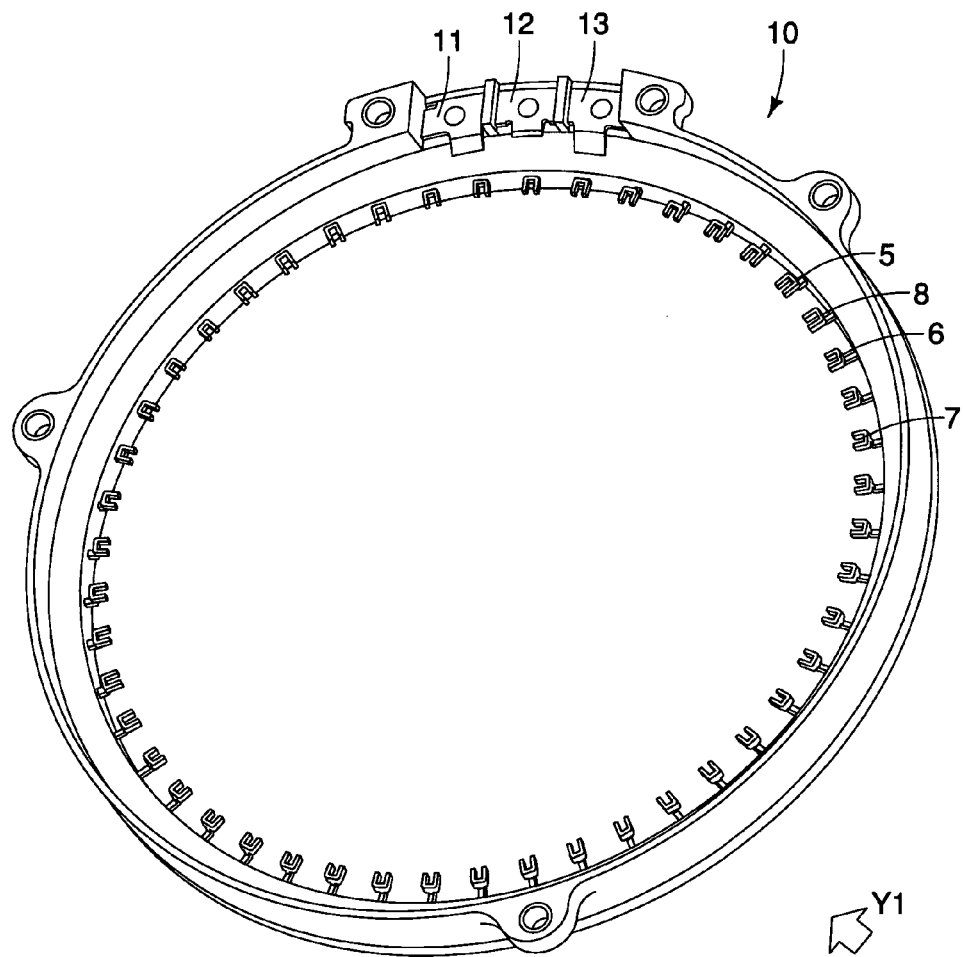
FIG. 4 illustrates an example of a motor power distribution apparatus according to a disclosed embodiment that is included in the stator.

FIG. 4 illustrates an overall view of an example of the power distribution structural component 10. FIGS. 5 to 8 respectively showing examples of a U-phase bus bar 50, a V phase bus bar 60, a W-phase bus bar 70 and a neutral phase bus bar 80 that are included in the power distribution structural component 10. These bus bars 50, 60, 70 and 80 can be formed from an electrical conductor, such as a suitable metal.

Figure 5:
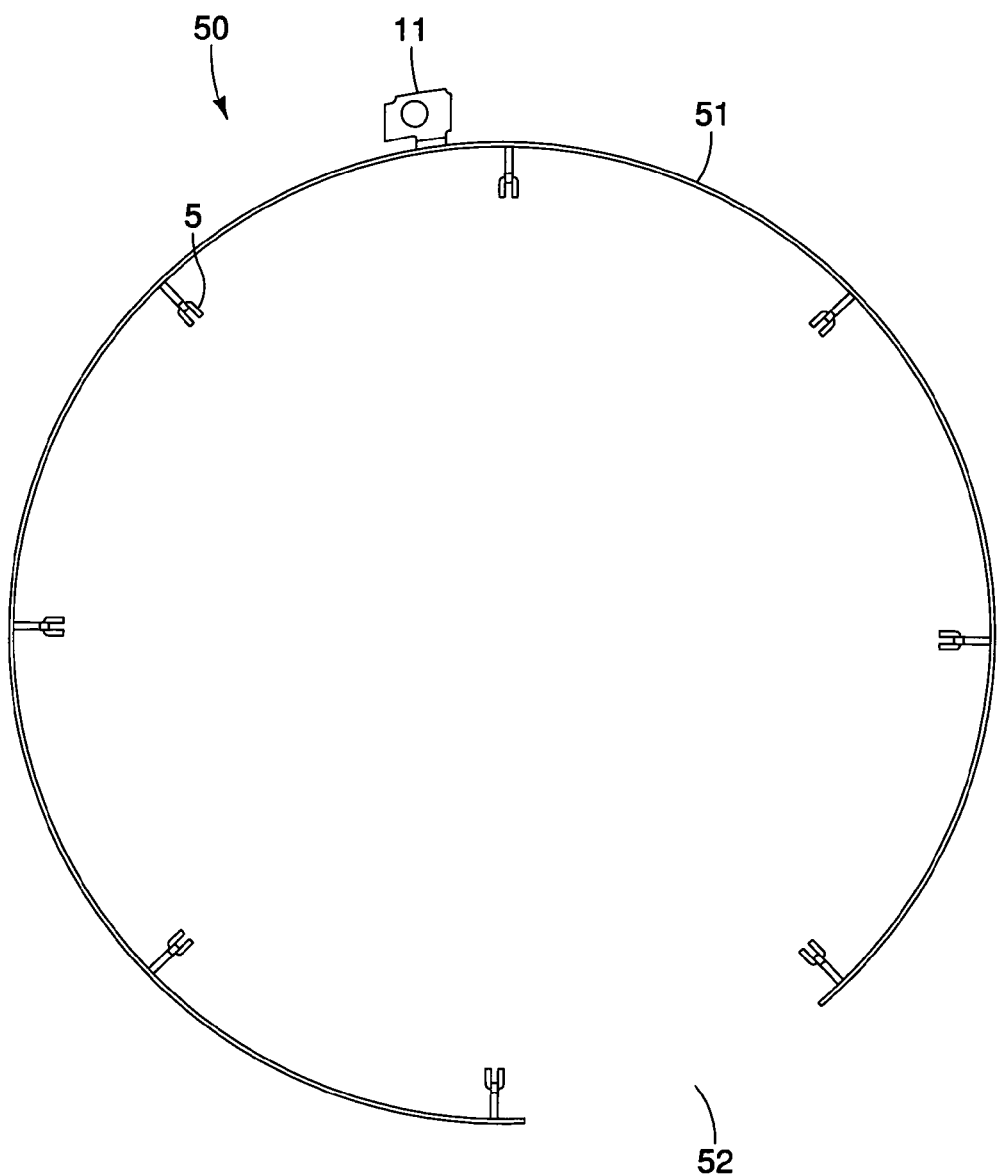
FIG. 5 illustrates an example of a U-phase bus bar included in the stator.
Figure 6:
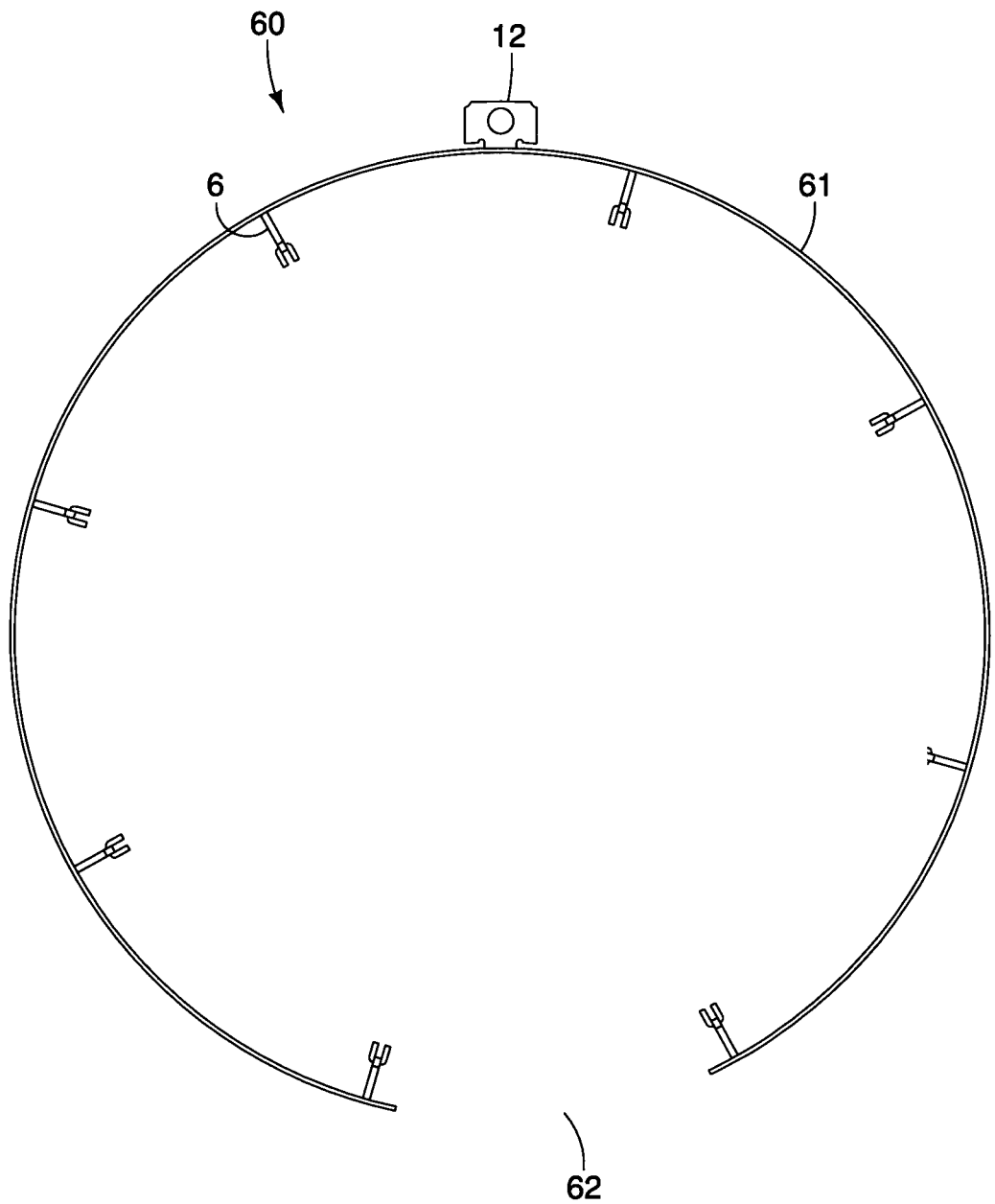
FIG. 6 illustrates an example of a V-phase bus bar included in the stator.
Figure 7:
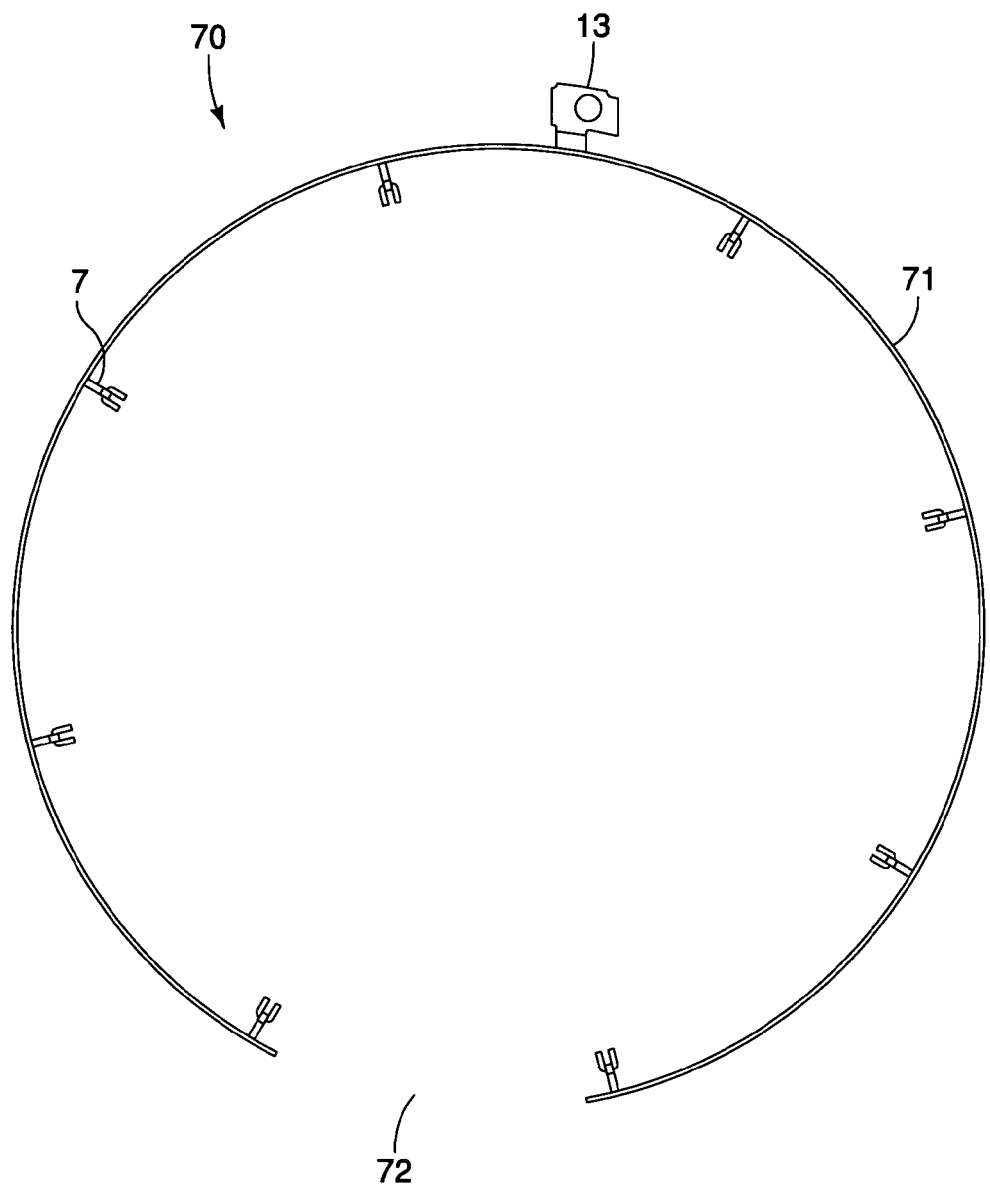
FIG. 7 illustrates an example of a W-phase bus bar included in the stator.

As shown in FIG. 5, the U-phase bus bar 50 includes a U-phase terminal 11, a plurality of U-phase tabs 5, and a U-phase bus 51. Likewise, as shown in FIG. 6, the V-phase bus bar 60 includes a V-phase terminal 12, a plurality of V-phase tabs 6, and a V-phase bus 61. As shown in FIG. 7, the W-phase bus bar 70 includes a W-phase terminal 13, a plurality of W-phase tabs 7, and a W-phase bus 71. The U-phase bus bar 50, the V-phase bus bar 60, and the W-phase bus bar 70 are respectively provided with cutouts 52, 62 and 72, and therefore lack a closed-ring shape. However, the U-phase bus bar 50, the V-phase bus bar 60, and the W-phase bus bar 70 can be configured as closed rings or in any other suitable shape.

Figure 8:
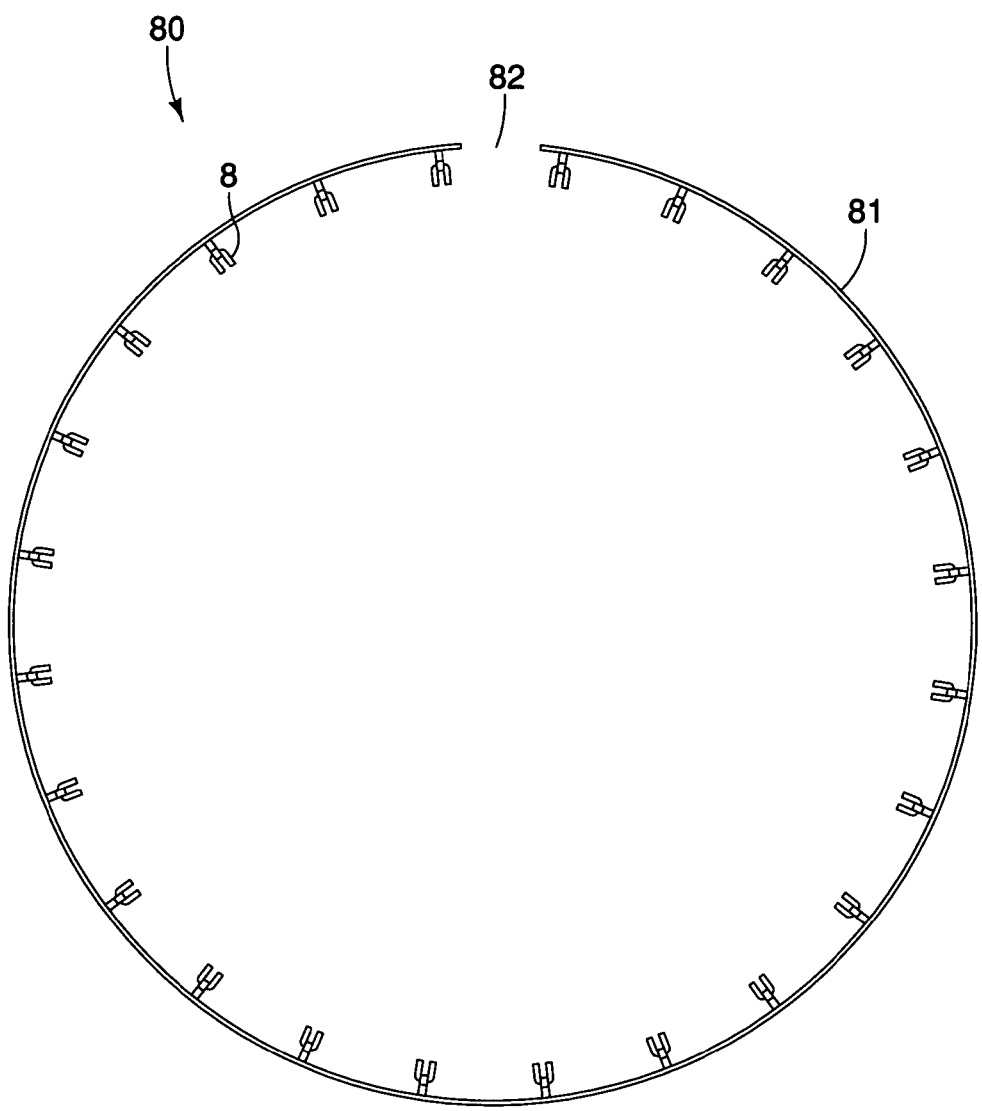
FIG. 8 illustrates an example of a neutral bus bar included in the stator.

The neutral bus bar 80 in this example is not connected to the power supply, and therefore no terminal need be provided for the neutral bus bar 80. Specifically, as shown in FIG. 8, the neutral bus bar 80 includes neutral tabs 8 and a neutral bus 81. The neutral bus bar 80 is also provided with a cutout 82. However, the neutral bus bar 80 can be configured as a closed ring or in any other suitable shape.

The U-phase bus bar 50, the V-phase bus bar 60, the W-phase bus bar 70 and the neutral bus bar 80 can be resin molded while being respectively insulated from one another, and can be insert molded into the shape shown in FIG. 4 in a manner as understood in the art. It is also possible to integrally insert mold a sleeve for bolting the power distribution structural component 10, and nuts for connecting the terminals 11 to 13 of each phase bus bar 50 to 70 to a power supply line, not shown.

Figure 9:
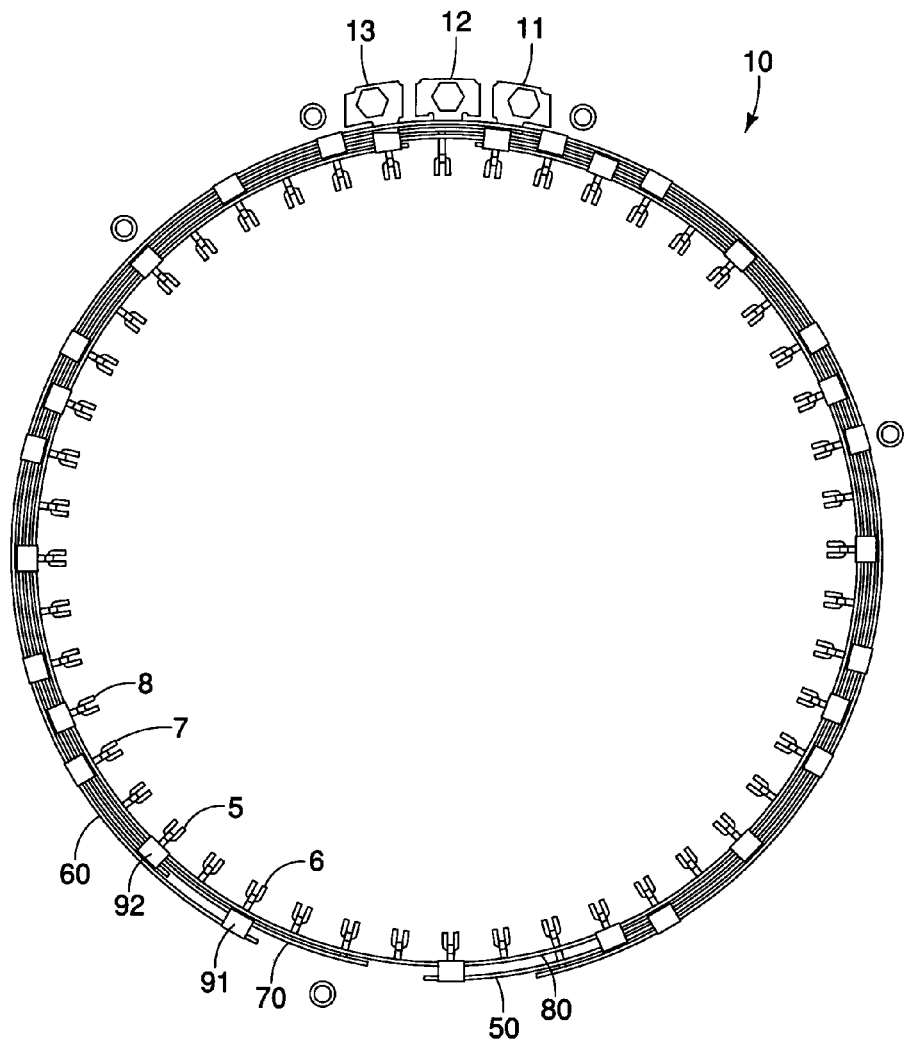
FIG. 9 illustrates an example of components of the motor power distribution apparatus shown in FIG. 4 prior to performing resin molding.
Figure 10:
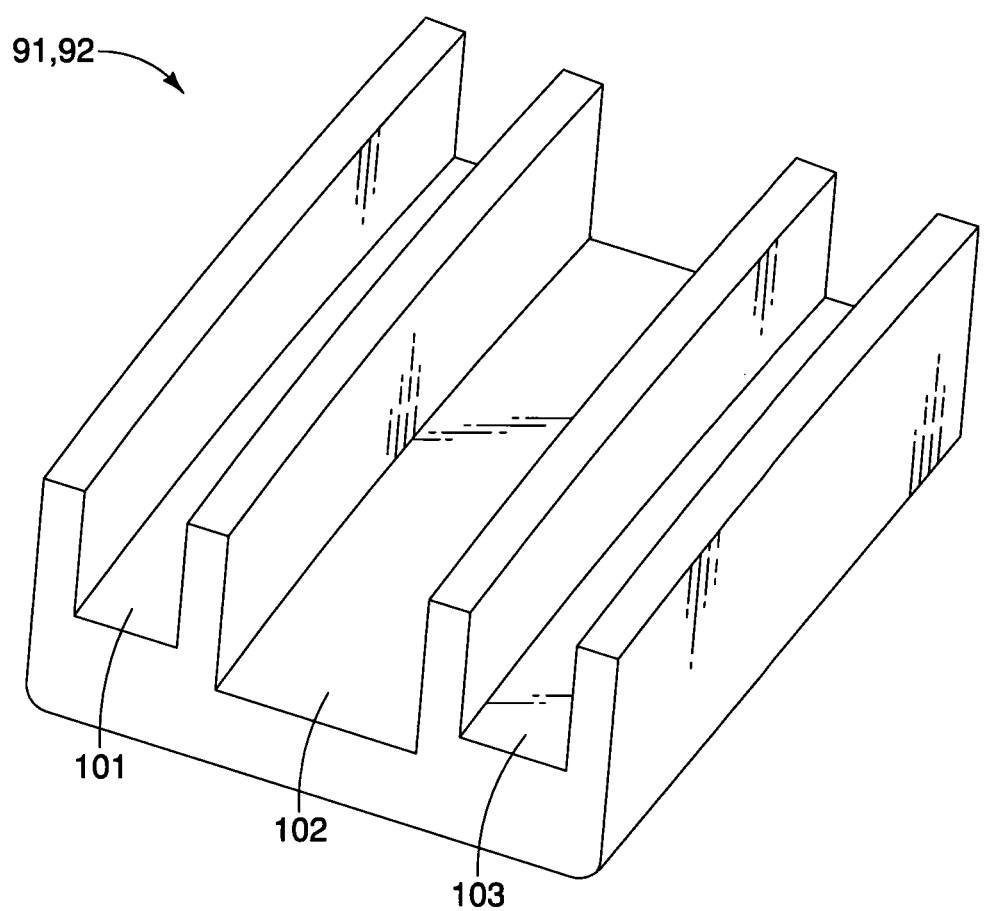
FIG. 10 illustrates an example a configuration of an insulating holder included in the motor power distribution apparatus.

FIG. 9 illustrates an example of components of a power distribution structural component 10 prior to performing resin molding. Specifically, FIG. 10 shows the power distribution structural component 10 viewed from the back side in the plane of the page as indicated by arrow Y1 in FIG. 4. The bus bars 50 to 80 are disposed in the order of the V-phase bus bar 60, the U-phase bus bar 50, the W-phase bus bar 70, and the neutral bus bar 80 from the outside peripheral side moving inward as shown.

Each bus bar 50 to 80 is fastened by insulating holders 91 and 92, which can be insulators and the same as each other or different from each other. Specifically, each of the bus bars 50 to 80 undergoes insert molding while being fastened by the insulating holders 91 and 92. In so doing, during insert molding, the bus bars 50 to 80 do not move or substantially do not move despite being subjected to pressure by the molding resin. Thus, the bus bars 50 to 80 can be secured in place. As further shown, the insulating holders 91 and the insulating holders 92 are disposed in alternating fashion without contacting one another. As shown in FIG. 9, the insulating holders 91 and 92 in this example do not form complete alternating arrays. That is, as shown in FIGS. 5 to 8, the bus bars 50 to 80 are provided with cutouts 52 to 82, respectively. Thus, the insulating holders 91 and 92 are not needed in portions where cutouts are present. Through the generally alternating disposition of the insulating holders 91 and the insulating holders 92, the bus bars 50 to 80 that are retained by the respective insulating holders 91 and 92 can be reliably fastened.

FIG. 10 illustrates an exemplary configuration of an insulating holder 91 and 92. As shown in FIG. 10, each of the insulating holders 91 and 92 is provided with three slots 101, 102 and 103. Of these three slots, the slot 102 at the center is wider in the lateral direction, and has a greater slot depth, as compared with the slots 101 and 103 disposed at either side. As discussed in more detail below, the slots 101 and 103 at either side are configured to retain buses, while the slot 102 at the center is not intended to retain any bus.

Figure 11:
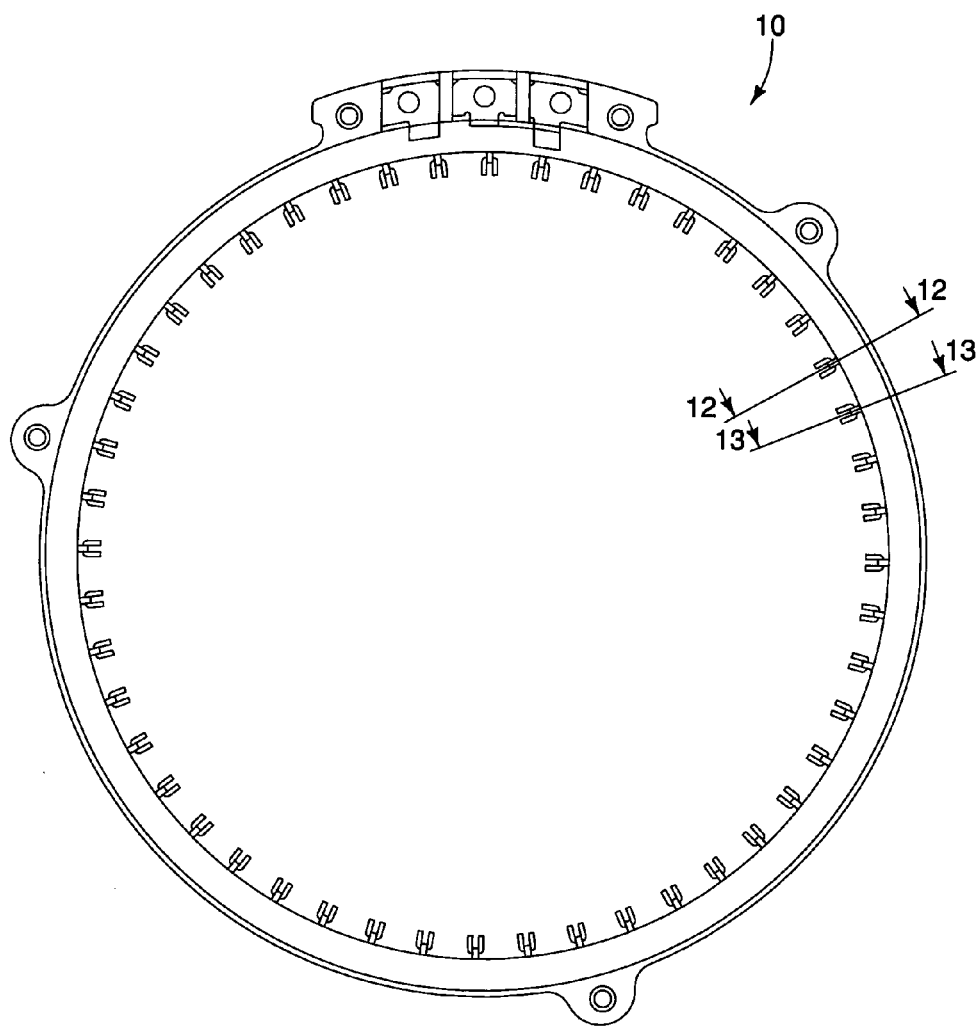
FIG. 11 illustrates an example of positions at which cross-sectional views are taken of the motor power distribution apparatus shown in FIG. 4.

FIG. 11 illustrates an example of positions at which cross-sectional views are taken of a power distribution structural component. Cross-sectional view 12-12 is taken a position that includes a first insulating holder 91, and cross-sectional view 13-13 is taken a position that includes a second insulating holder 92. Thus, FIG. 12 is a cross-sectional view taken along lines 12-12 in FIG. 11, and FIG. 13 is a cross sectional view taken along lines 13-13 in FIG. 11.

Figure 12:
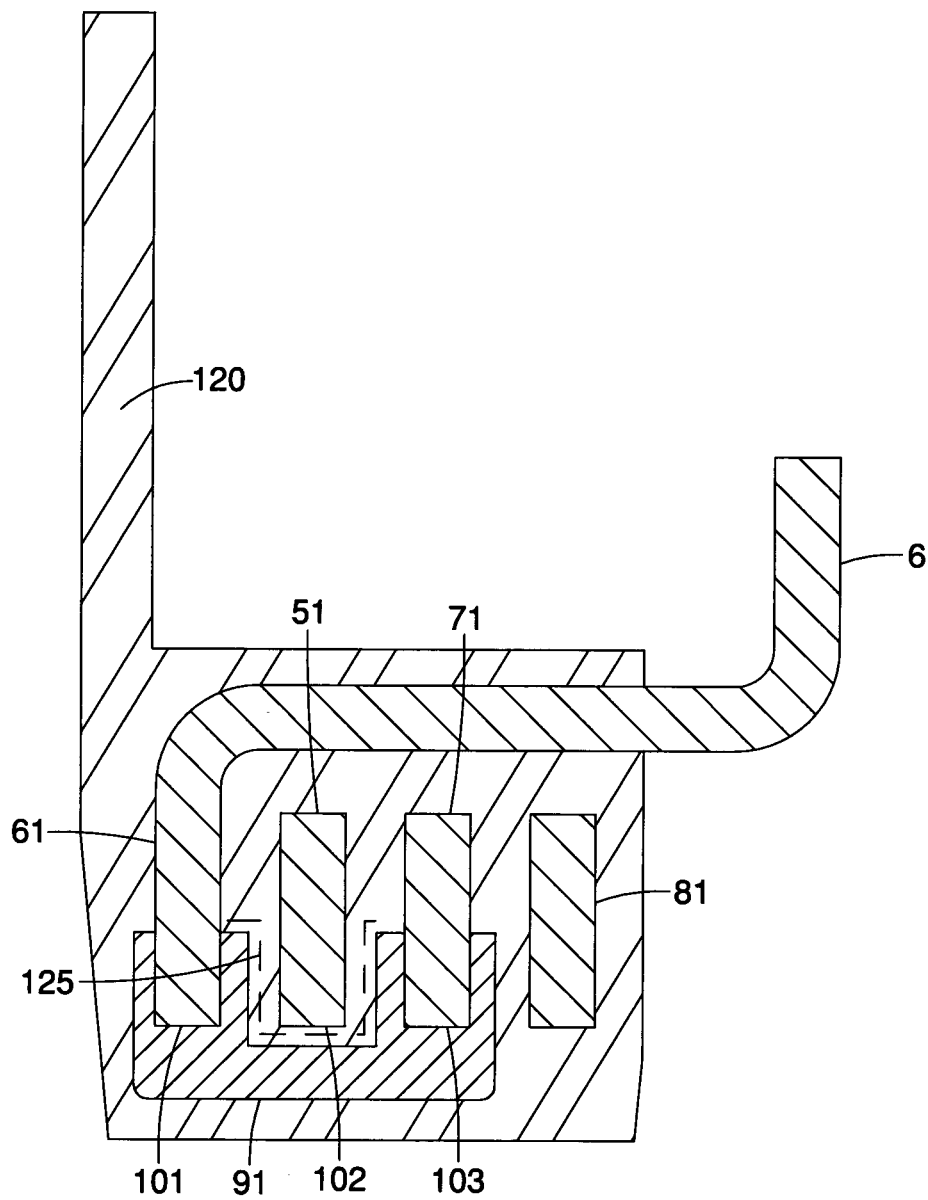
FIG. 12 is a cross-sectional view taken along lines 12-12 in FIG. 11.
Figure 13:
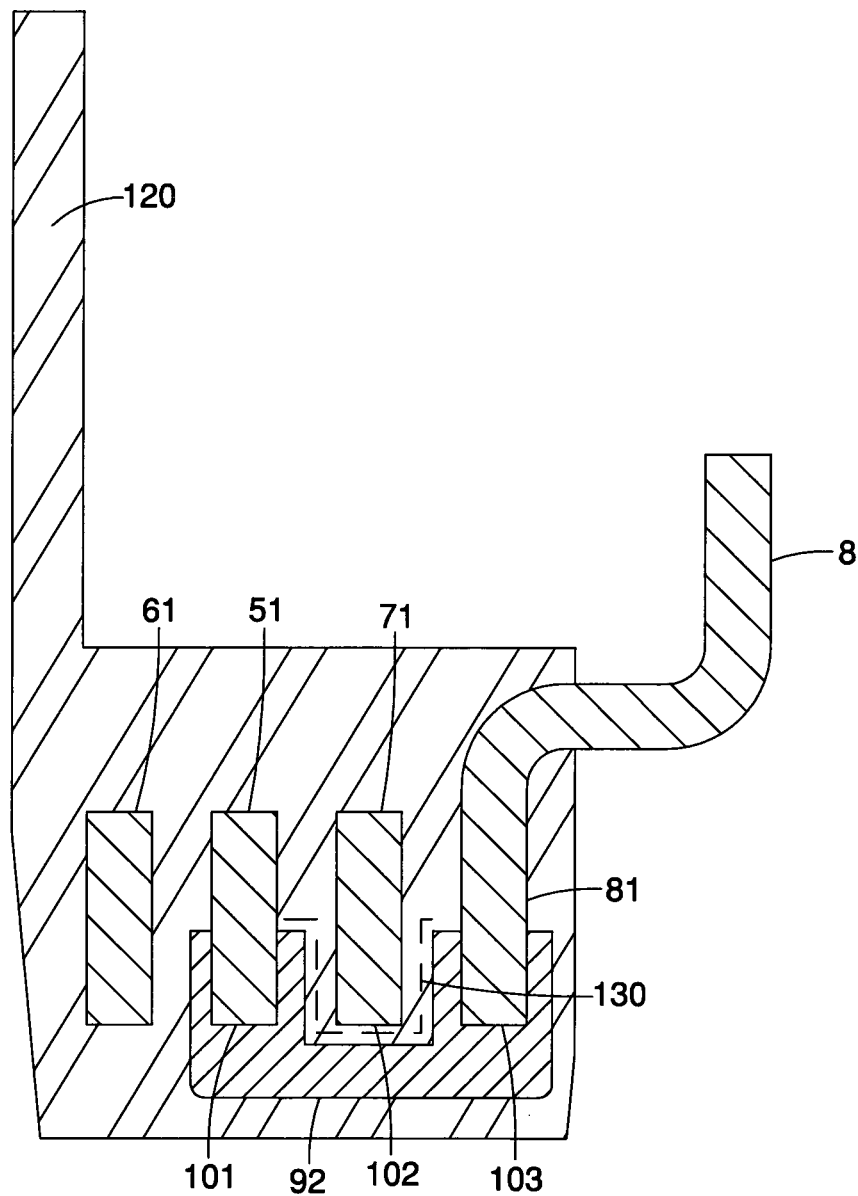
FIG. 13 is a cross-sectional view taken along lines 13-13 in FIG. 11.

As shown in FIG. 12, the slots 101 and 103 at the left and right edges of the first insulating holder 91 mate with the V-phase bus 61 and the W-phase bus 71, respectively. Specifically, the slots 101 and 103 at the left and right edges of the first insulating holder 91, respectively, receive the V-phase bus 61 and the W-phase bus 71, respectively.

However, the wider, deeper slot 102 at the very center does not contact the U-phase bus 51. Specifically, the U-phase bus 51 is completely covered or substantially covered by the molded resin 120, which is an insulator. Likewise, the neutral bus 81 does not contact the first insulating holder 91. Thus, the neutral bus 81 is completely covered or substantially covered by the molded resin 120, which is an insulator. In so doing, the U-phase bus 51 and the neutral bus 81 are solidly insulated by the molded resin 120, and can therefore maintain sufficient insulating capability even when the molded resin is thin.

In addition, in this example, the insulating capability of each of the V-phase bus 61 and the W-phase bus 71 can be determined by the length of creepage of the first insulating holder 91 as shown by the broken line 125 in FIG. 12. Typically, creepage insulation has less insulating ability than does solid insulation. Therefore, a long creepage distance may be used in order to ensure high insulating capability. However, as shown in FIG. 12, the V-phase bus 61 and the W-phase bus 71 are not contiguous. Also, the U-phase bus 51, which is covered or substantially covered by the molded resin 120, is present between the V-phase bus 61 and the W-phase bus 71 to provide a creepage distance that is sufficiently large to provide adequate insulation.

As shown in FIG. 13, the slots 101 and 103 at the left and right edges of the second insulating holder 92 mate with the U-phase bus 51 and the neutral bus 81, respectively. Specifically, the slots 101 and 103 at the left and right edges of the second insulating holder 92 receive the U-phase bus 51 and the neutral bus 81, respectively.

However, the wider, deeper slot 102 at the very center does not contact the W-phase bus 71. Specifically, the W-phase bus 71 is completely covered or at least substantially covered by the molded resin 120, which is an insulator. Likewise, the V-phase bus 61 does not contact the second insulating holder 92. Thus, the V-phase bus 61 is completely covered or at least substantially covered by the molded resin 120, which is an insulator. Accordingly, the W-phase bus 71 and the V-phase bus 61 are solidly insulated by the molded resin 120, and can therefore maintain sufficient insulating capability even if the molded resin is thin.

Furthermore, the insulating capability of the U-phase bus 51 and the neutral bus 81 can be determined by the length of creepage of the second insulating holder 92 as shown by the broken line 130 in FIG. 13. As discussed above, typically creepage insulation has less insulating ability than does solid insulation. Therefore, a long creepage distance is used to ensure high insulating capability. However, as shown in FIG. 13, the U-phase bus 51 and the neutral bus 81 are not contiguous. Also, the W-phase bus 71, which is covered or substantially covered by the molded resin 120, is present between the U-phase bus 51 and the neutral bus 81 to provide a creepage distance that is sufficiently large to provide adequate insulation.

By adopting such a configuration, it is no longer necessary to make the height of the wall of the insulating holder 91 or 92 equal to or greater than the bus height in order to ensure creepage insulation capability. Accordingly, the power distribution structural component 10 can be more compact. Also, in conventional structures in which the height of the insulating holder wall is set to equal to or greater than bus height, it was necessary to bend the tabs in order to ride over the insulating holders. However, in the power distribution structural component 10, there is no need to bend the tabs 5 to 7.

In the power distribution structural component 10, it is desirable to maintain the positions of the tabs 5 to 7 which connect with the coils 2 to 4 with high accuracy. Therefore, the insulating holders 91 and 92, which fasten the bus bars 50 to 80, are fastened at positions close to tabs 5 to 7. Consequently, as shown in FIG. 9, the first insulating holders 91 are disposed in proximity to V-phase tabs 6 or W-phase tabs 7, and the second insulating holders 92 are disposed in proximity to U-phase tabs 5 or neutral tabs 8.

Accordingly, as can be appreciated from the above, the power distribution structural component 10 is a power distribution structural component of a motor with a plurality of stacked bus bars 50, 60, 70, 80 unified by insert molding. The power distribution structural component 10 includes first insulating holders 91 that are insulators and are configured to retain every other one of the plurality of bus bars (e.g., bus bars 50 and 70). The power distribution structural component 10 further includes second insulating holders 92 that are insulators and are configured to retain bus bars (e.g., bus bars 60 and 80) other than the bus bars (e.g., bus bars 50 and 70) retained by the first insulating holders 91. Thus, the insulating holder 91 retains bus bars 60 and 70 which are not contiguous and does not contact the bus bars 50 and 80. Likewise, the insulating holder 92 retains bus bars 50 and 80 which are not contiguous and does not contact the bus bars 60 and 70. Therefore, the portions of bus bars 50 to 80 that are not contacted can be covered or substantially covered with molded resin, which ensures solid insulation between contiguous bus bars 50 to 80. Additionally, the portions of the bus bar 50 that is covered or substantially covered with the molded resin is present between the bus bars 60 and 80 which are retained by the insulating holder 91. Furthermore, the portions of the bus bar 70 that is covered or substantially covered with the molded resin is present between the bus bars 50 and 80 which are retained by the insulating holder 92. Therefore, a sufficient creepage insulation distance between the retained bus bars 50 to 80 can be ensured. Specifically, there is no need to raise the height of the walls of the insulating holders 91 and 92 between the bus bars 50 to 80 in order to ensure a sufficient creepage insulation distance. Thus, the power distribution structural component 10 can be made more compact.

Accordingly, as discussed above, the power distribution structural component 10 includes three bus bars 50, 60 70 which distribute electrical current to the winding wires corresponding to each of the phases 2 to 4 of the motor. The power distribution structural component 10 further includes a neutral bus bar 80 that connects the neutral points of the winding wires. The first insulating holders 91 retain the outermost peripheral bus bar, such as bus bar 60, and the third from outermost peripheral bus bar, such as bus bar 70. On the other hand, the second insulating holders 92 retain the second from outermost peripheral bus bar, such as bus bar 50, and the innermost peripheral bus bar, such as bus bar 80. In so doing, both the first insulating holders 91 and the second insulating holders 92 can retain non-contiguous bus bars.

Also, each of the first insulating holders 91 and the second insulating holders 92 has three slots for retaining the bus bars in this example. In this configuration, the slot 102 at the very center is larger in width and deeper in depth than the slots 101 and 103 at either side. Therefore, the bus bars are retained in the slots 101 and 103 at either side, whereas the bus bars are not retained in the slot 102 at the center. Hence, the bus bars received in the slot 102 at the very center do not contact the insulating holders 91 and 92 and are solidly insulated by the molded resin.

An example of a power distribution structural component 10A according to a second disclosed embodiment will now be described. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical or substantially identical to the parts of the first embodiment may be omitted for the sake of brevity.

Figure 14:
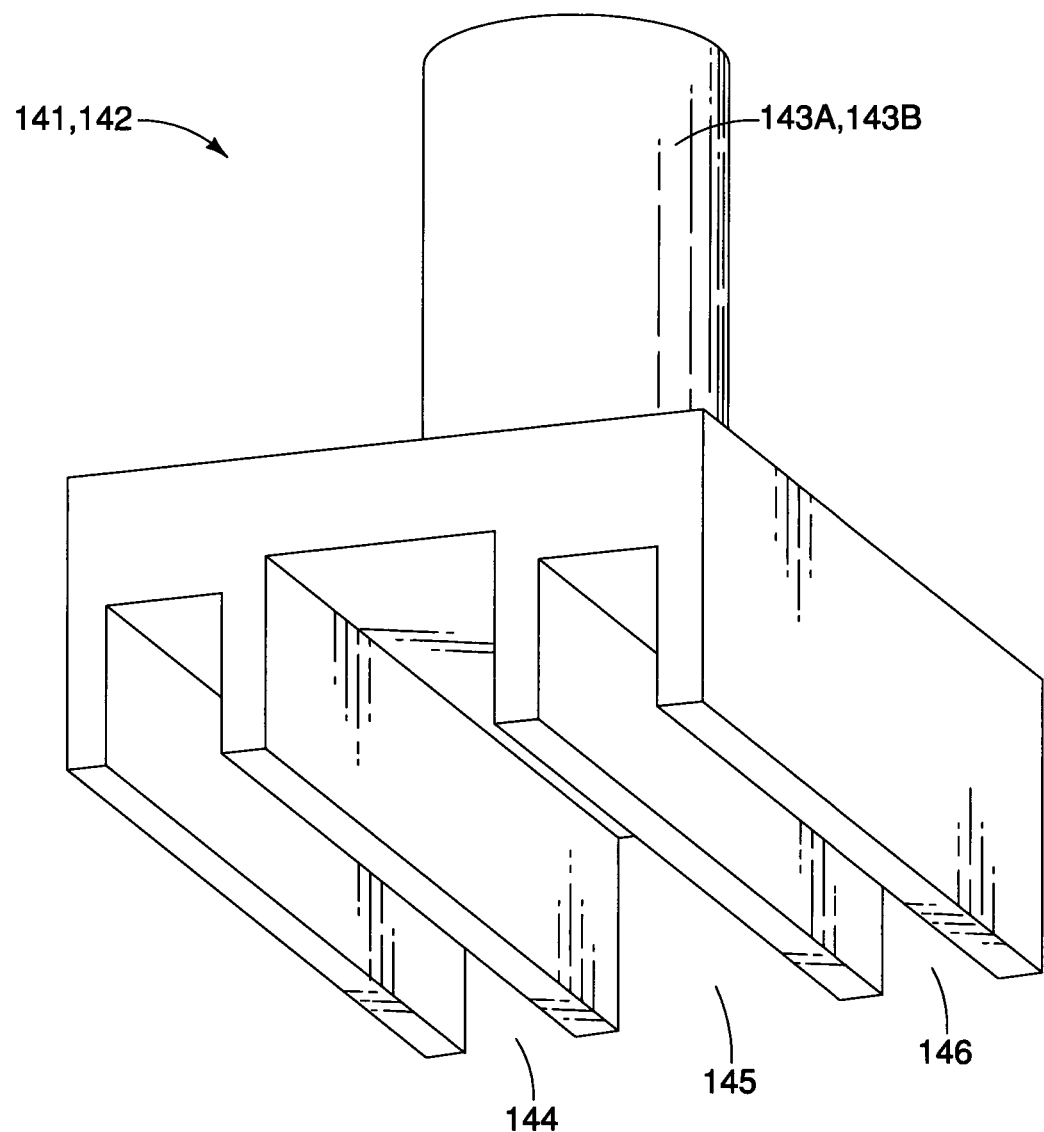
FIG. 14 illustrates an exemplary shape of the first insulating holders and the second insulating holders according to another disclosed embodiment.
Figure 18:
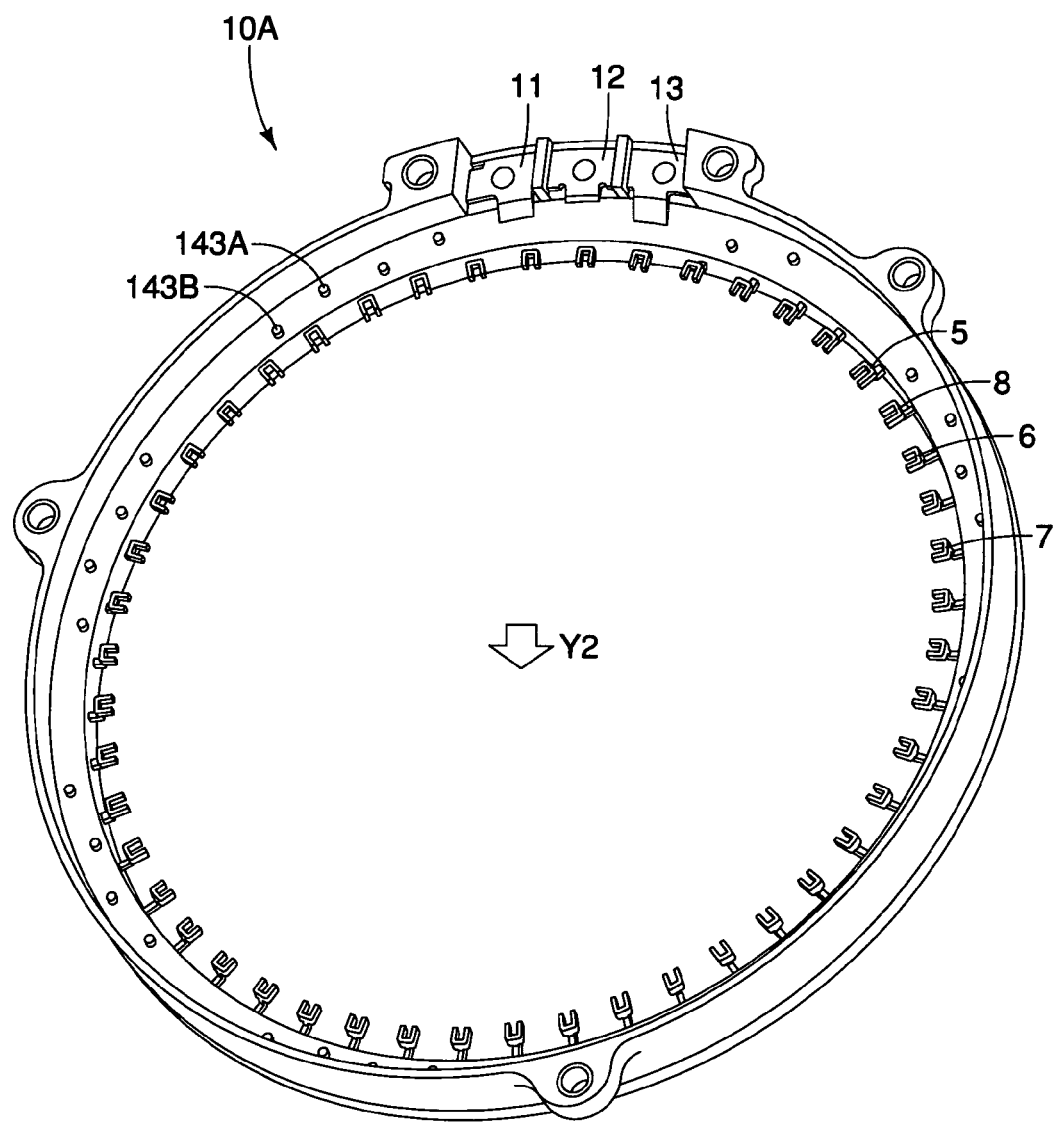
FIG. 18 illustrates an example of view of a motor power distribution apparatus including the first insulating holders and the second insulating holders shown in FIG. 14 that is included in the stator.

FIG. 14 illustrates an example of the shape of the first insulating holders 141 and the second insulating holders 142 in this second disclosed embodiment. As indicated, each of the first insulating holders 141 and the second insulating holders 142 has three slots 144, 145 and 146, and a positioning projection 143. In this example, the positioning projection of the first insulating holder 141 is denoted as 143A, and the positioning projection of the second insulating holder 142 is denoted as 143B as shown in FIG. 18 discussed below. As with the insulating holders 91 and 92 of the first embodiment, the slot 145 at the center is wider in the lateral direction and has greater slot depth as compared to the slots 144 and 146 at either side.

Figure 15:
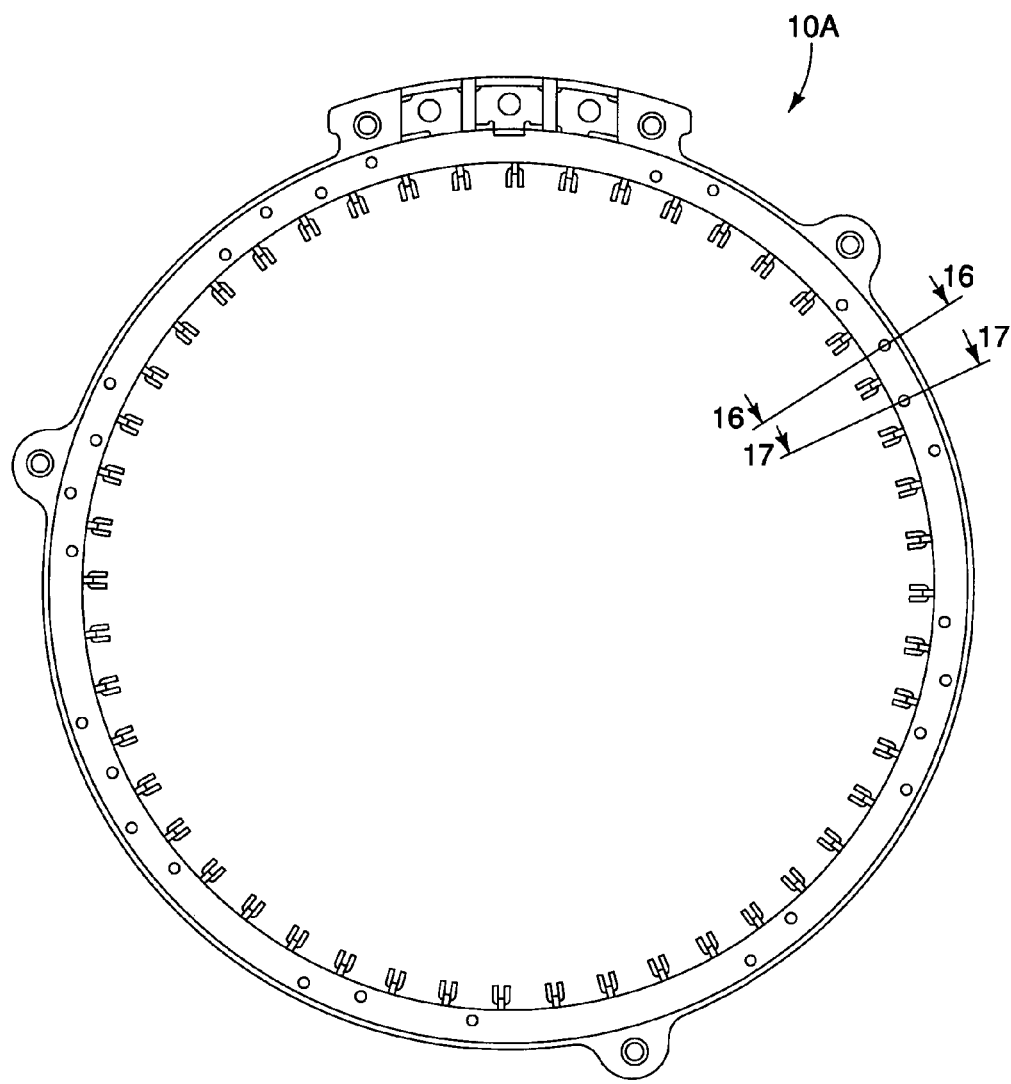
FIG. 15 illustrates an example of positions at which cross-sectional views are taken of the motor power distribution apparatus including the first insulating holders and the second insulating holders shown in FIG. 14.
Figure 16:
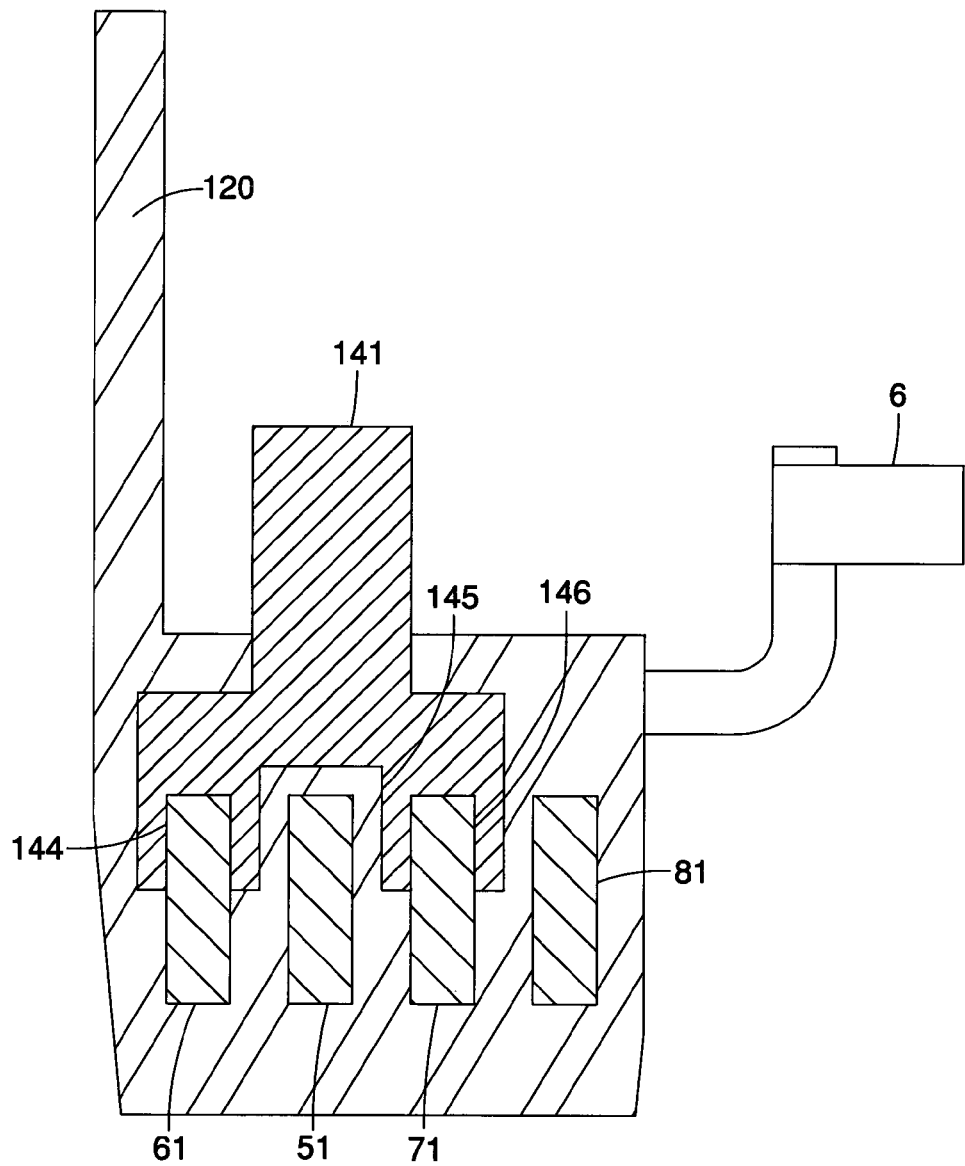
FIG. 16 is a cross-sectional view taken along lines 16-16 in FIG. 15.
Figure 17:
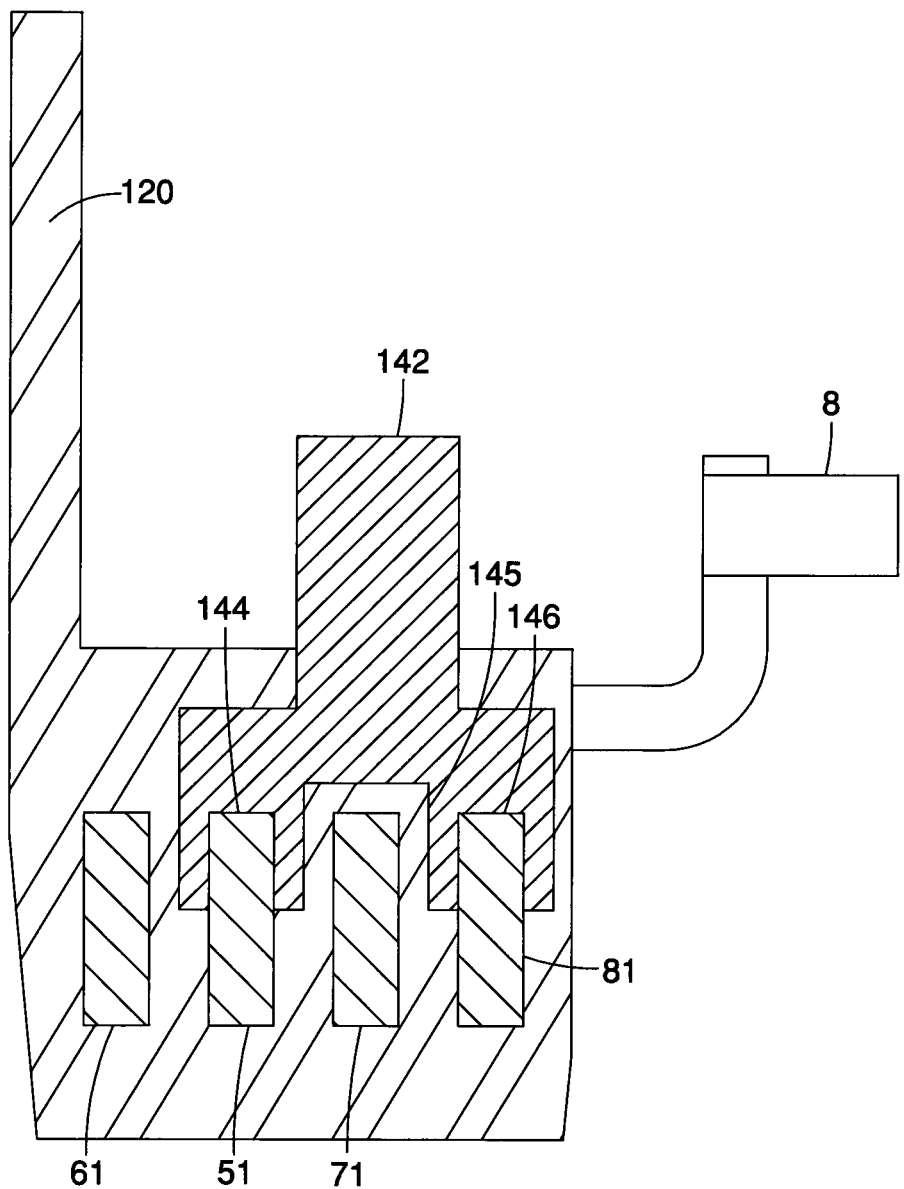
FIG. 17 is a cross-sectional view taken along lines 17-7 in FIG. 15.

FIG. 15 illustrates examples of positions at which cross-sectional views are taken of the distribution structural component 10A in the second embodiment. Thus, FIG. 16 is a cross-sectional view taken at cross section position 16-16 in FIG. 15, and FIG. 17 is a cross-sectional view taken at cross section position 17-17 in FIG. 15.

The mating relationships between the first insulating holders 141 and the buses of each of the phases are the same or similar as in the first embodiment. Specifically, as shown in FIG. 16, the slots 144 and 146 at the left and right edges, respectively, of the first insulating holders 141 mate with the V-phase bus 61 and the W-phase bus 71, respectively. Also, the wider, deeper slot 145 at the very center does not contact the U-phase bus 51. Thus, as in the first embodiment, the U-phase bus 51 is completely covered or substantially covered by the molded resin 120, which is an insulator. Likewise, the neutral bus 81 does not contact the first insulating holder 141. Thus, the neutral bus 81 is completely covered or substantially covered by the molded resin 120, which is an insulator. In so doing, the U-phase bus 51 and the neutral bus 81 are solidly insulated by the molded resin 120, and can therefore maintain sufficient insulating capability even when the molded resin is thin. Consequently, the creepage insulation of the V-phase bus 61 and the W-phase bus 71 has a sufficient creepage distance length for adequate insulation.

The mating relationships between the second insulating holders 142 and the buses 50 to 80 of each of the phases 2 to 4 are also the same as in the first embodiment. Specifically, as shown in FIG. 17, the slots 144 and 146 at the left and right edges, respectively, of the second insulating holders 142 mate with the U-phase bus 51 and the neutral bus 81, respectively. Also, the wider, deeper slot 145 at the very center does not contact the W-phase bus 71. Therefore, as in the first embodiment, the W-phase bus 71 is completely covered or substantially covered by the molded resin 120, which is an insulator. Likewise, the V-phase bus 61 does not contact the first insulating holder 91. Thus, the V-phase bus 61 is completely covered or substantially covered by the molded resin 120, which is an insulator. In so doing, the V-phase bus 61 and the W-phase bus 71 are solidly insulated by the molded resin 120, and can therefore maintain sufficient insulating capability even when the molded resin is thin. Consequently, the creepage insulation of the U-phase bus 51 and the neutral bus 81 has a sufficient creepage distance length for adequate insulation.

Figure 19:
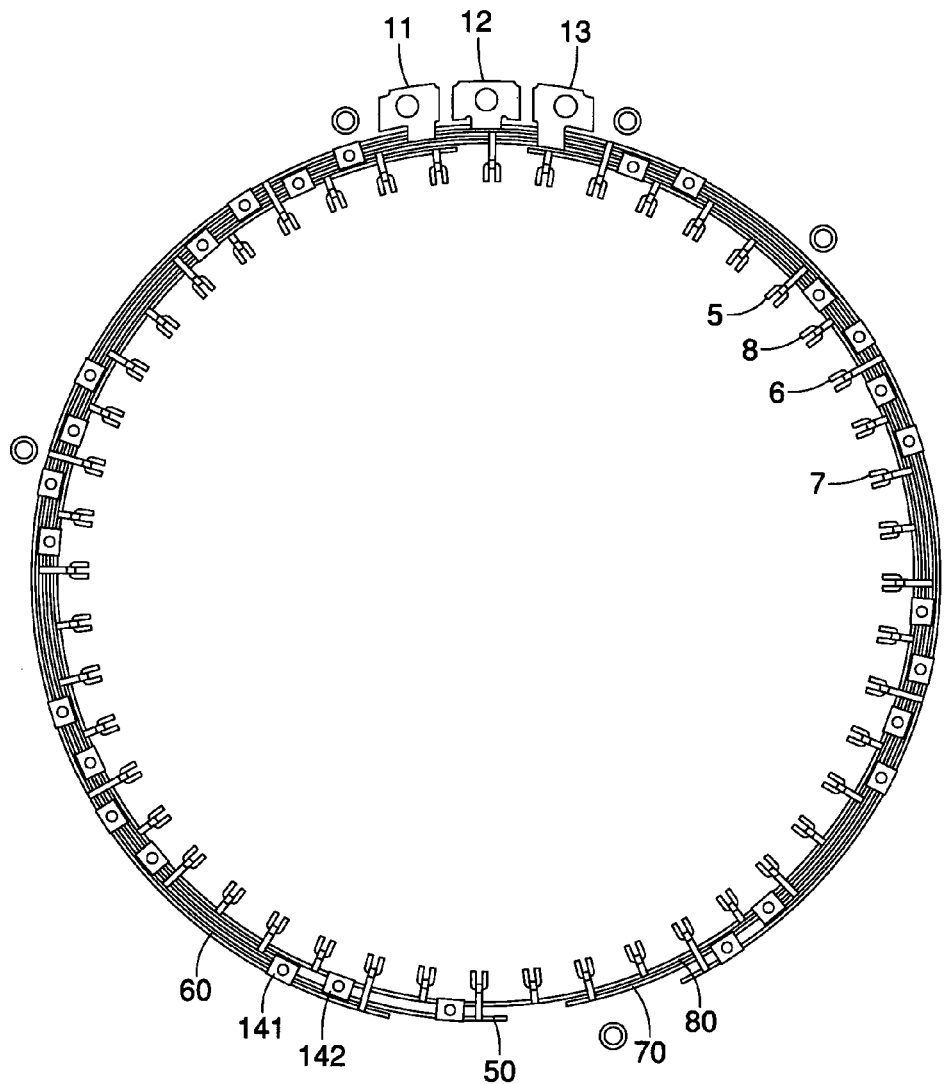
FIG. 19 illustrates an example of components of the motor power distribution apparatus shown in FIG. 18 prior to performing resin molding.

Furthermore, FIG. 18 is an overall view of the power distribution structural component 10A in the second embodiment. FIG. 19 is a layout diagram of components of the power distribution structural component 10A prior to performing resin molding. The power distribution structural component 10A is viewed from the back side in the plane of the page as indicated by arrow Y2 in FIG. 18. The first insulating holders 141 and the second insulating holders 142 are sandwiched by the buses of each phase from the direction opposite that of the insulating holders 91 and 92 of the first embodiment. This is done in order that the positioning projections 143A and 143B may be inserted into the lower die, which is the stationary die, of the insert mold.

Figure 20:
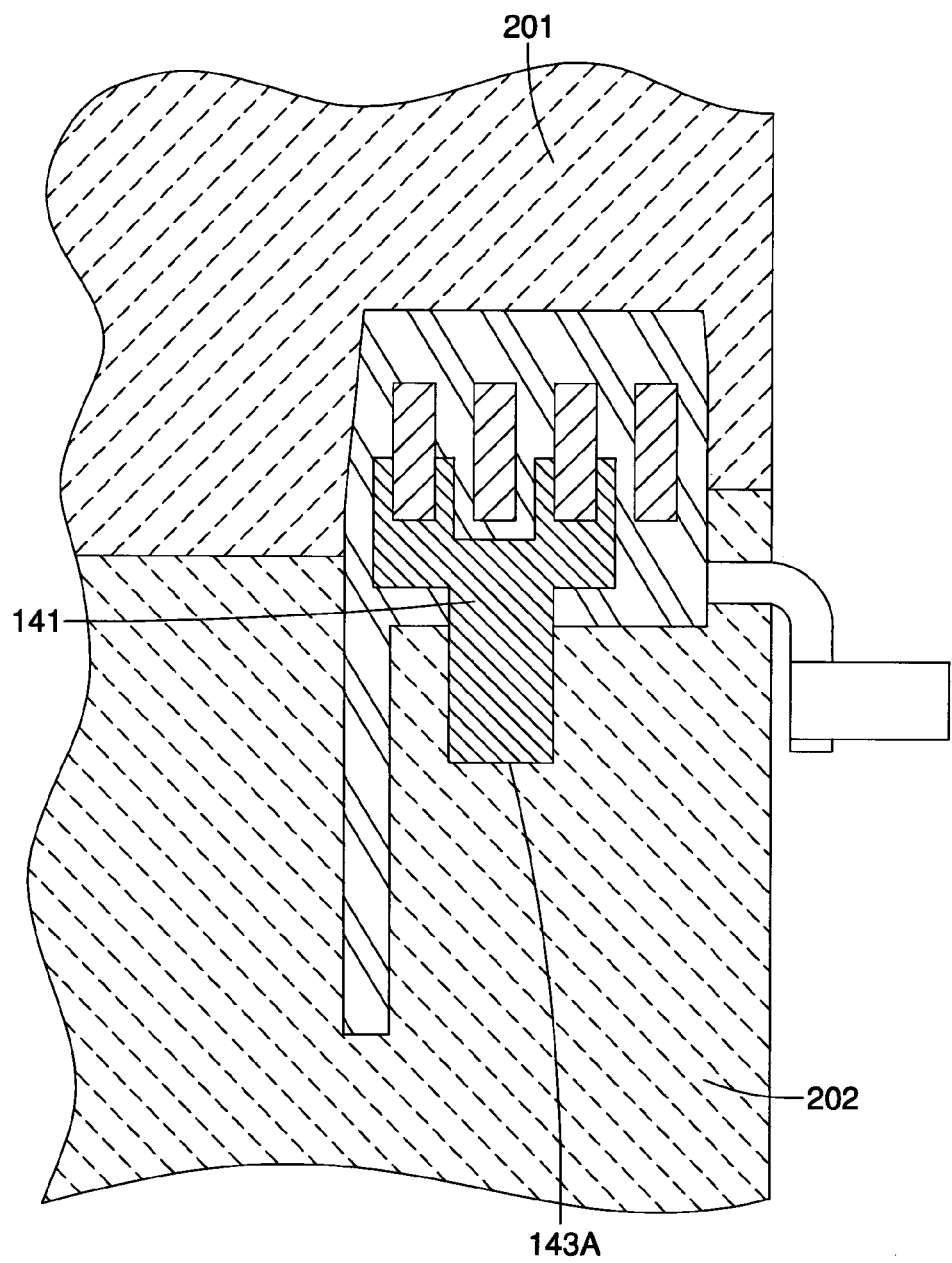
FIG. 20 illustrating an example of the positioning of a projection of a first insulating holder in a stationary die of an insert mold.

FIG. 20 is a diagram showing an example of the positioning projection 143A of a first insulating holder 141 in a condition of being inserted into a stationary die 202 of an insert mold. The positioning projection 143A of the first insulating holder 141 is fastened to be inserted into the stationary die 202 of the insert mold. In this example, the other die is the moving die 201. Accordingly, the position of the first insulating holder 141 can be fixed with improved accuracy. Also, although not shown in the drawing, the second insulating holders 142 are similarly disposed. Therefore, because the positions of all of the insulating holders 141 and 142 can be fixed with improved accuracy, the positions of the bus bars of each of the phases which are retained by the insulating holders 141 and 142 can likewise be fixed with improved accuracy.

In addition, although the power distribution structural components 10 and 10A discussed above include a neutral bus bar 80, the power distribution structural component may not include a neutral bus bar. An example of a power distribution structural component of a third embodiment is described with regard to FIGS. 21 and 22. As shown, the power structural components 10 and 10A according to this third embodiment do not include a neutral bus bar 80. In view of the similarity between the first, second and third embodiments, the parts of the third embodiment that are identical to the parts of the first embodiment will be given the same reference numerals as the parts of the first and second embodiments. Moreover, the descriptions of the parts of the third embodiment that are identical or substantially identical to the parts of the first and second embodiments may be omitted for the sake of brevity.

Figure 21:
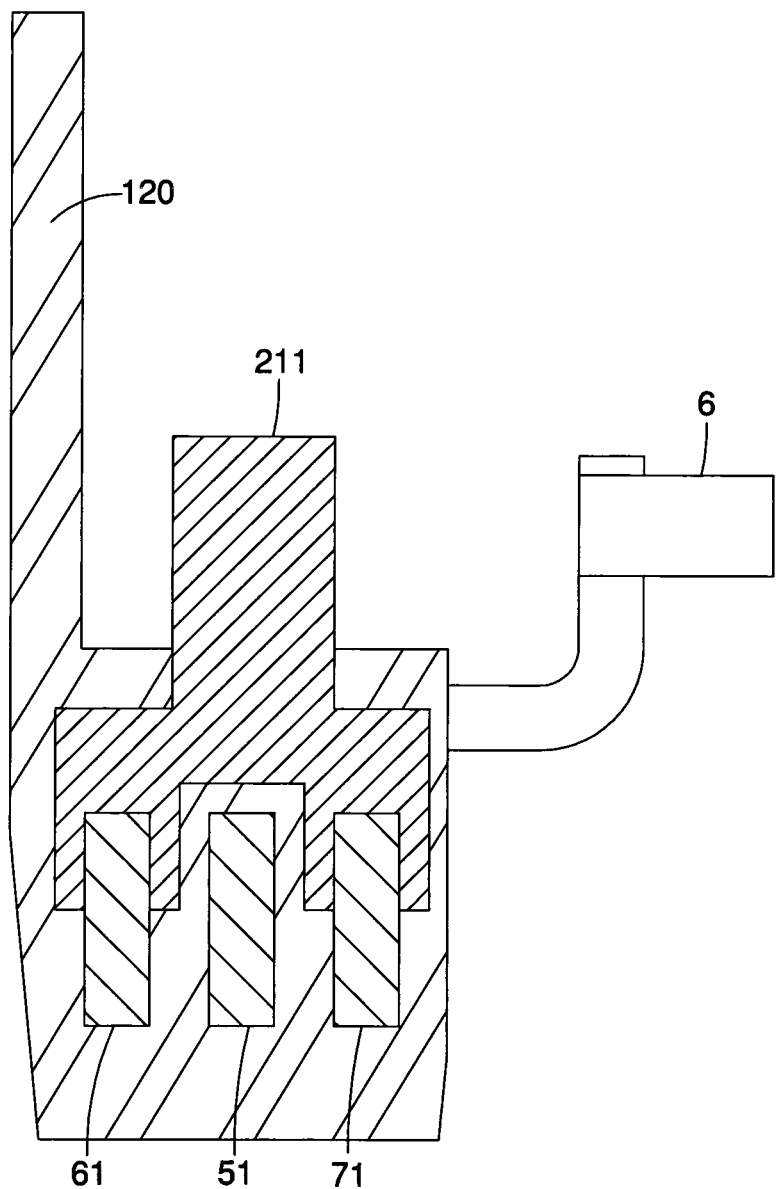
FIG. 21 is a cross-sectional view of a power distribution structural component lacking a neutral bus bar according to a further disclosed embodiment, taken in a plane that includes a first insulating holder.
Figure 22:
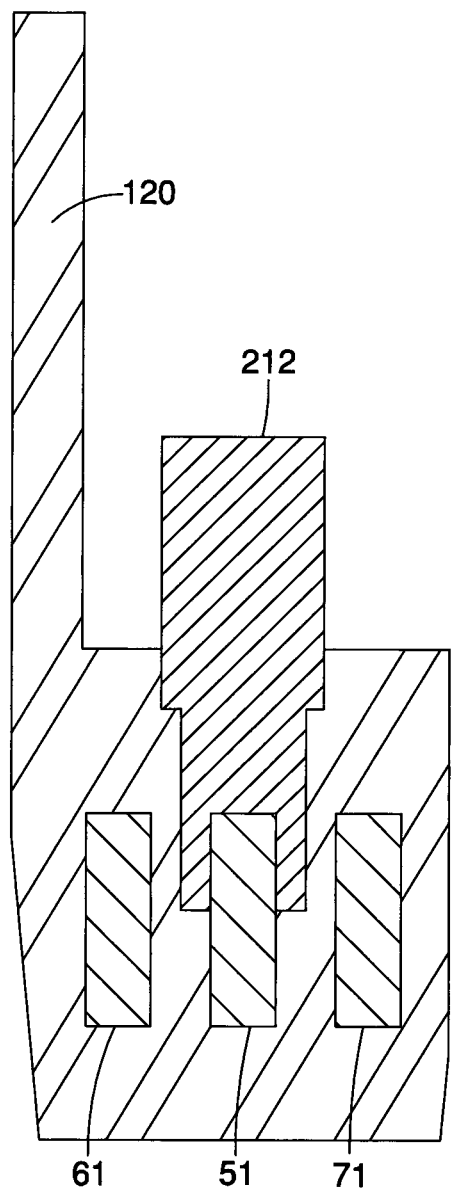
FIG. 22 is a cross-sectional view of the power distribution structural component lacking a neutral bus bar, taken in a plane that includes a second insulating holder.

FIG. 21 is a cross-sectional view of a power distribution structural component lacking a neutral bus bar, as taken in a plane that includes a first insulating holder 211. FIG. 22 is a cross-sectional view of a power distribution structural component lacking a neutral bus bar, as taken in a plane that includes a second insulating holder 212. As shown in FIG. 21, the structure of the first insulating holder 211 is the same or substantially the same as the structure of the first insulating holders 141 described previously. The second insulating holder 212, on the other hand, has a single slot for mating with the U-phase bus 51, as shown in FIG. 22.

As shown in FIG. 21, the first insulating holders 211 retain every other one of the bus bars, such as bus bars 60 and 70, by retaining buses 61 and 71, respectively. As shown in FIG. 22, the second insulating holders 212 retain one or more bus bars other than the bus bars which are retained by the first insulating holders 211. In this example, the second insulating holders 212 retain bus bar 50 by retaining bus 51. Accordingly, these configurations achieve an effect comparable to that of a power distribution structural component 10 or 10A having a neutral bus bar as discussed above.

In addition, the power distribution structural components discussed above may be employed in a two-phase motor instead of a three-phase motor. In this arrangement, the first insulating holders 91 and 141 can have a structure that retains the outer bus bar, such as bus bar 60, and does not contact the inner bus bar, such as bus bar 80. The second insulating holders have a structure that retains the inner bus bar, such as bus bar 80, and does not contact the outer bus bar, such as bus bar 60.

According to the power distribution structural component of the second and third embodiments above, the first insulating holders 141 and 211 have positioning projections 143A, respectively, and the second insulating holders 142 and 212 have positioning projections 143B, respectively. Thus, the positioning projections 143A and 143B can fix the positions of the respective insulating holders 141, 142, 211 and 212 with regard to the motor. Therefore, the positions of the first insulating holders 141 and 211 and the second insulating holders 142 and 212 can be fixed with sufficient accuracy. Hence, the positions of the bus bars 50 to 80 which are retained by the insulating holders 141, 142, 211 and 212 can be fixed with sufficient accuracy. This eliminates the need to provide the dies, such as dies 201 and 202, of the insert mold with supports for retaining the insulating holders 141, 142, 211 and 212. Thus, the costs associated with die fabrication can be reduced.

Figure 23:
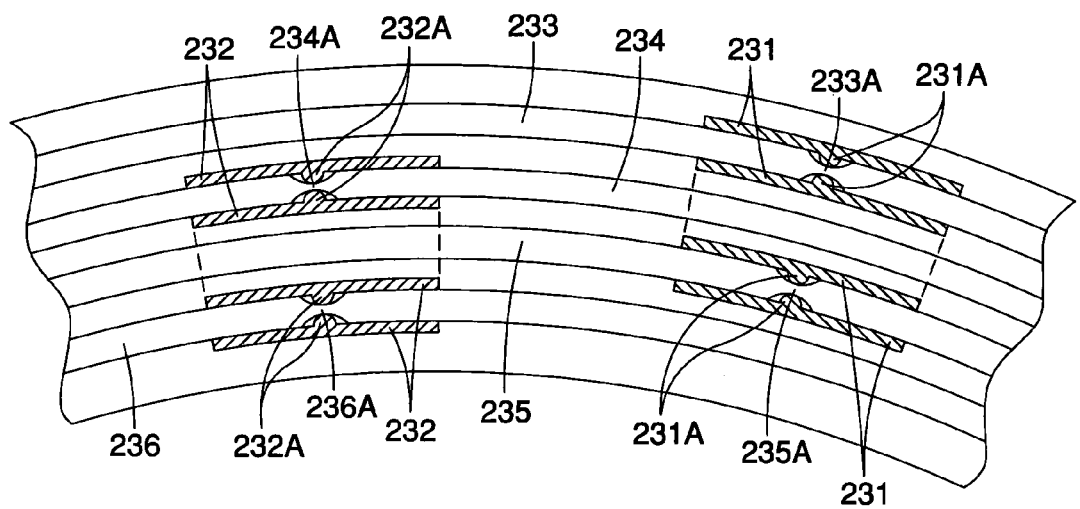
FIG. 23 is a cross-sectional view of a power distribution structural component according to another disclosed embodiment, taken in a cross-section perpendicular to the stator axis center.

The insulating holders can also have different configurations to accommodate bus bars with different configurations. For example, FIG. 23 is a cross-sectional view of a power distribution structural component of a fourth disclosed embodiment, taken in a cross-section perpendicular to the stator axis center. In this example, the U-phase bus bar 234, the V-phase bus bar 233, the W-phase bus bar 235, and the neutral bar 236 have localized recesses 234A, 233A, 235A and 236A, respectively. Accordingly, the first insulating holders 231 have projections 231A which correspond to the shape of the recess 233A of the V-phase bus bar 233 and of the recess 235A of the W-phase bus bar 235. These projections are set into the recesses on the bus bar sides as shown in FIG. 23. Likewise, the second insulating holders 232 have projections 232A which correspond to the shape of the recess 234A of the U-phase bus bar 234 and of the recess 236A of the neutral-phase bus bar 236. These projections are set into the recesses on the bus bar sides as shown in FIG. 23.

Optionally, the bus bars 233 to 236 may have through-holes in place of recesses. In this type of configuration, the insulating holders can have projections that are set into the through-holes of the bus bars.

Accordingly, the plurality of recesses or through-holes in the bus bars 233 to 236 that mate or interlock with the first insulating holders 231 or the second insulating holders 232 cam improve the positional accuracy of the bus bars 233 to 236 relative to the insulating holders 231 and 232. In so doing, the positional accuracy of the tabs, such as tabs 5 to 7, of the bus bars 233 to 236 improves. Therefore, the process for adjusting the positions of the bus bars 233 to 236 for attaching the motor winding wires can be made simpler. Also, the configuration in which the insulating holders 231 and 232 are set into the bus bars 233 to 236 can increase the ability of the insulating holders 231 and 232 to retain the bus bars 233 to 236, even for small insulating holders. Moreover, because the insulating holders 231 and 232 can be smaller, the flow of resin molding material improves, and the intervals between the bus bars 233 to 236 of each of the phases can be shortened.

It should also be noted that a power distribution structural component lacking a neutral bus bar and a power distribution structural component for implementation in a two-phase motor can also be configured to include the features of the third and fourth embodiments as discussed above.

According to the power distribution structural component 10 in the first embodiment, the first insulating holders 91 retain the V-phase bus 61 and the W-phase bus 71, while the second insulating holders 92 retain the U-phase bus 51 and the neutral bus 81. Consequently, the relative positions of the V-phase bus 61 and the W-phase bus 71, the U-phase bus 51, and the neutral bus 81 can be positioned as appropriate. Furthermore, the tabs 5 to 7 of the bus bars 50 to 70 can be fastened to the dies of an insert mold, not shown, to improve positing of the bus bars 50 to 70.

Figure 24:
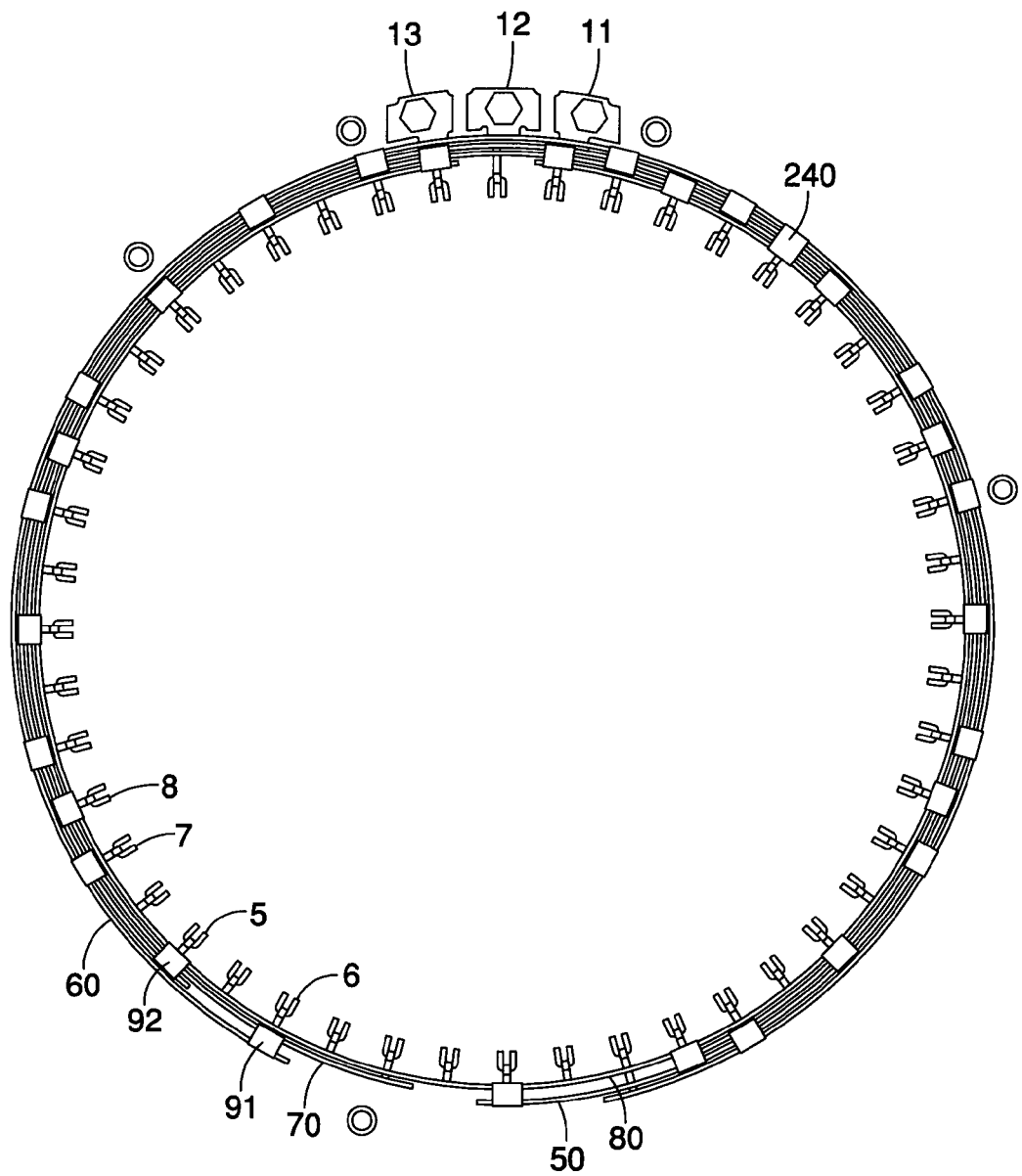
FIG. 24 illustrates an example of an outermost V-phase bus and an innermost neutral bus retained by a third insulating holder.

In addition, as shown in FIG. 24, certain of the buses can be retained with a third insulating holder 240 that is separate from the first insulating holders 91 and the second insulating holders 92. In this example, the V-phase bus 61 (the outermost bus) and the neutral bus 81 (the innermost bus) can be retained with the third insulating holder 240 that is separate from the first insulating holders 91 and the second insulating holders 92. For simplicity, only a single third insulating holder 240 is shown. However, as with the first and second insulating holders 91 and 92, a plurality of third insulating holders 240 are provided to retain the V-phase bus 61 and the neutral bus 81.

Furthermore, the third insulating holder 240 retains the outermost the V-phase bus 61 and the innermost neutral bus 81 without contacting the U-phase bus 51 or the W-phase bus 71. In so doing, the relative positions of the V-phase bus 61 and the W-phase bus 71, and the relative positions of the U-phase bus 51 and the neutral bus 81, can be fixed. Consequently, the positional accuracy of each of the bus bars 50 to 80 can be improved. This can allow the flow of the resin mold to be more stable and uniform, thus improving the formation of the resin stabilized. In addition, the second, third and fourth embodiments discussed above can also be configured to include a third insulating holder. Naturally, a separate insulating holder can be used to retain each of the buses 51 to 81, or the insulating holders can be configured to retain the buses 51 to 81 in any suitable manner to achieve the desired characteristics as discussed above.

Moreover, a process for forming the embodiments discussed above includes a step of retaining every other one of a plurality of power distribution members by first insulating holders which are insulators. The process further includes a step of retaining power distribution members other than the power distribution members retained by the first insulating holders by second insulating holders which are insulators. The process also includes a step of performing insert molding while the plurality of power distribution members are retained by the first insulating holders and the second insulating holders. Accordingly, in all of the embodiments discussed above, the power distribution members which are retained by the insulating holders are not contiguous, but instead sandwich power distribution members which have been coated with molding resin. Thus, sufficient creepage insulation distance can be ensured without the need to raise the height of the wall of the insulating holders.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device that is constructed to carry out the desired function. The terms of degree such as "substantially", "about" and "approximately" as used herein mean a reasonable amount of deviation of the modified term such that the end result is not significantly changed.

Moreover, while only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric motor power distribution apparatus for electric power distribution comprising:
   first electric insulating holders that are disposed to retain every other one of a plurality of stacked power distribution members of a motor, the plurality of stacked power distribution members including three bus bars which distribute current to winding wires of a stator; and
   second electric insulating holders that are disposed to retain power distribution members other than the power distribution members retained by the first electric insulating holders,
   the first electric insulating holders and the second electric insulating holders being disposed circumferentially about an axis of the motor.

2. The electric motor power distribution apparatus according to claim 1, wherein
   the first electric insulating holders and the second electric insulating holders are disposed in generally alternating fashion without contacting one another.

3. The electric motor power distribution apparatus according to claim 1, wherein
   each of the first electric insulating holders and the second electric insulating holders includes a positioning portion for fixing the position with respect to the motor.

4. The electric motor power distribution apparatus according to claim 1, wherein
   the plurality of power distribution members include a plurality of tabs for connection to the winding wires of each of the phases; and
   the first electric insulating holders and the second electric insulating holders are disposed in proximity to the tabs.

5. An electric motor power distribution apparatus for electric power distribution comprising:
   first electric insulating holders that are disposed to retain every other one of a plurality of stacked power distribution members of a motor; and
   second electric insulating holders that are disposed to retain power distribution members other than the power distribution members retained by the first electric insulating holders,
   the first electric insulating holders and the second electric insulating holders being disposed circumferentially about an axis of the motor,
   the plurality of stacked power distribution members including three bus bars which distribute current to winding wires of a stator corresponding to each of a plurality of phases of the motor, and a neutral bus bar which connects neutral points of each of the winding wires;
   the first electric insulating holders retaining the outermost peripheral bus bar and the third from outermost peripheral bus bar in a radial direction of the stator; and
   the second electric insulating holders retaining the second from outermost peripheral bus bar and the innermost peripheral bus bar in the radial direction of the stator.

6. The electric motor power distribution apparatus according to claim 5, wherein
   the first electric insulating holders and the second electric insulating holders respectively include three slots for retaining the power distribution members; and
   the slot at a center of the first and second electric insulating holders is larger in width and deeper in depth than the slots at either side of the first and second electric insulating holders.

7. An electric motor power distribution apparatus for electric power distribution comprising:
   first electric insulating holders that are disposed to retain every other one of a plurality of stacked power distribution members of a motor; and
   second electric insulating holders that are disposed to retain power distribution members other than the power distribution members retained by the first electric insulating holders,
   the first electric insulating holders and the second electric insulating holders being disposed circumferentially about an axis of the motor,
   the plurality of stacked power distribution members including three bus bars which distribute current to winding wires of a stator corresponding to each of a plurality of phases of the motor;
   the first electric insulating holders retaining the outermost peripheral bus bar and the innermost peripheral bus bar in a radial direction of the stator; and
   the second electric insulating holders retaining a center bus bar disposed radially between the innermost and outermost peripheral bus bars.

8. The electric motor power distribution apparatus according to claim 7, wherein
   the first electric insulating holders include three slots for retaining the power distribution members; and
   the slot at a center of the first electric insulating holders is greater in width and deeper in depth than the slots at either side of the first electric insulating holders.

9. The electric motor power distribution apparatus according to claim 8, wherein
   the first electric insulating holders and the second electric insulating holders are disposed in generally alternating fashion without contacting one another.

10. An electric motor power distribution apparatus for electric power distribution comprising:
    first electric insulating holders that are disposed to retain every other one of a plurality of stacked power distribution members of a motor;
    second electric insulating holders that are disposed to retain power distribution members other than the power distribution members retained by the first electric insulating holders; and a third electric insulating holder for retaining an outermost peripheral bus bar and an innermost peripheral bus bar in a radial direction of the stator, without contacting a second from outermost peripheral bus bar and a third from outermost peripheral bus bar in the radial direction of the stator, the first electric insulating holders and the second electric insulating holders being disposed circumferentially about an axis of the motor.

11. The electric motor power distribution apparatus according to claim 10, wherein each of the first electric insulating holders and the second electric insulating holders includes a positioning portion for fixing the position with respect to the motor.

12. The electric motor power distribution apparatus according to claim 11, wherein the positioning portion is fastened to a stationary die of an insert mold.

13. The electric motor power distribution apparatus according to claim 12, wherein the bus bars define one of a plurality of recesses and a plurality of holes that are configured to interlock with the first electric insulating holders or the second electric insulating holders.

14. The electric motor power distribution apparatus according to claim 13, wherein the plurality of power distribution members include a plurality of tabs for connection to the winding wires of each of the phases; and the first electric insulating holders and the second electric insulating holders are disposed in proximity to the tabs.

15. An electric motor power distribution apparatus for electric power distribution comprising:

first electric insulating holders that are disposed to retain every other one of a plurality of stacked power distribution members of a motor;

second electric insulating holders that are disposed to retain power distribution members other than the power distribution members retained by the first electric insulating holders; and a plurality of bus bars, the bus bars defining one of a plurality of recesses and a plurality of holes that are configured to interlock with the first electric insulating holders or the second electric insulating holders, the first electric insulating holders and the second electric insulating holders being disposed circumferentially about an axis of the motor.

16. A method for producing an electric motor power distribution apparatus comprising:

positioning first electric insulating holders to retain every other one of a plurality of stacked power distribution members of a motor, the plurality of stacked power distribution members including three bus bars which distribute current to winding wires of a stator;

positioning second electric insulating holders to retain power distribution members other than the power distribution members retained by the first electric insulating holders; and insert molding the stacked power distribution members while the stacked power distribution members are retained by the first and second electric insulating holders, the first electric insulating holders and the second electric insulating holders being disposed circumferentially about an axis of the motor.

* * * * *